(12) United States Patent
Seiler

(10) Patent No.: US 10,223,809 B2
(45) Date of Patent: Mar. 5, 2019

(54) BANDWIDTH-EFFICIENT LOSSY FRAGMENT COLOR COMPRESSION OF MULTI-SAMPLE PIXELS

(71) Applicant: Intel Corporation, Santa Clara, CA (US)

(72) Inventor: Larry Seiler, Boylston, CA (US)

(73) Assignee: Intel Corporation, Santa Clara, CA (US)

(*) Notice: Subject to any disclaimer, the term of this patent is extended or adjusted under 35 U.S.C. 154(b) by 87 days.

(21) Appl. No.: 15/167,717

(22) Filed: May 27, 2016

(65) Prior Publication Data

US 2017/0345186 A1 Nov. 30, 2017

(51) Int. Cl.
| | |
|---|---|
| G06T 9/00 | (2006.01) |
| G06T 1/20 | (2006.01) |
| G06T 1/60 | (2006.01) |
| G06T 5/00 | (2006.01) |
| G06T 15/00 | (2011.01) |

(52) U.S. Cl.
CPC .............. *G06T 9/00* (2013.01); *G06T 1/20* (2013.01); *G06T 1/60* (2013.01); *G06T 5/002* (2013.01); *G06T 15/005* (2013.01)

(58) Field of Classification Search
CPC .................................................. G06T 15/503
See application file for complete search history.

(56) References Cited

U.S. PATENT DOCUMENTS

| | | | |
|---|---|---|---|
| 7,751,633 B1* | 7/2010 | Mukherjee | ........... H04N 19/176 382/166 |
| 2014/0267377 A1* | 9/2014 | Halstvedt | ............... G06T 11/40 345/613 |
| 2016/0035129 A1* | 2/2016 | Bolz | ..................... G06T 15/005 345/420 |

OTHER PUBLICATIONS

Young, Peter, "CSAA (Coverage Sampling Antialiasing)", nVidia, Apr. 17, 2011 http://www.nvidia.com/object/coverage-sampled-aa.html.*

* cited by examiner

*Primary Examiner* — Phi Hoang
(74) *Attorney, Agent, or Firm* — Schiff Hardin LLP

(57) ABSTRACT

Described herein are technologies related to facilitate lossy compression for multi-sample color data of computer graphics that maximizes the apparent quality of pixels while avoiding a corresponding burden on memory and processor bandwidth.

14 Claims, 26 Drawing Sheets

Conventional Fragment Color Compression

Conventional Fragment Color Compression

Lossless Fragment Color Compression

Lossy Fragment Color Compression

| Fragment 0 | Fragment 1 | Fragment 2 | Fragment 3 |
|---|---|---|---|
| Fragment 4 | Fragment 5 | X | 3-bit Mask, 16x 620 |

8x Fragment Mode for 32-bit Pixels

FIG. 6B

| Fragment 0 | Fragment 1 | Fragment 2 | Fragment 3 |
|---|---|---|---|
| Fragment 4 | 3-bit Mask for 16 samples 610 | | |

8x Fragment Mode for 16-bit Pixels

FIG. 6A

| Pixel 0 | Pixel 1 | Pixel 2 | Pixel 3 | Fragment 0 | Fragment 1 | Fragment 2 | Fragment 3 |
|---|---|---|---|---|---|---|---|
| Fragment 4 | Fragment 5 | Fragment 6 | Map | 3-bit Mask | 2-bit Mask | 2-bit Mask | 2-bit Mask |

1010

Vertex Mode for 2x2 Pixels

FIG. 10

| Pixel 0 | Pixel 1 | Pixel 2 | Pixel 3 |
|---|---|---|---|
| unused | | | |
| unused | | | |
| unused | | | |

1110

Single Color Mode

FIG. 11A

| Pixel 0 | Pixel 1 | Pixel 2 | Pixel 3 |
|---|---|---|---|
| Fragment 0 | Fragment 1 | Map | Mask | Mask |
| unused | | | |
| unused | | | |

1120

Edge Colors Mode

FIG. 11B

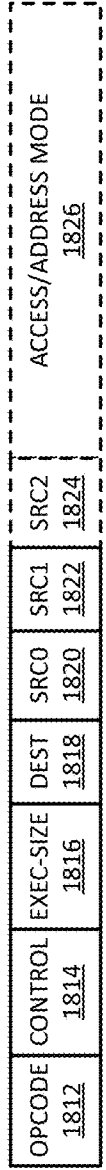
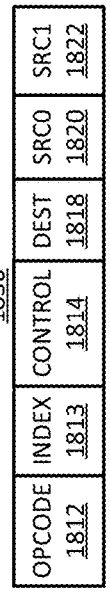
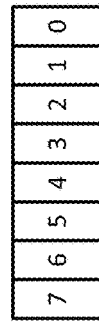
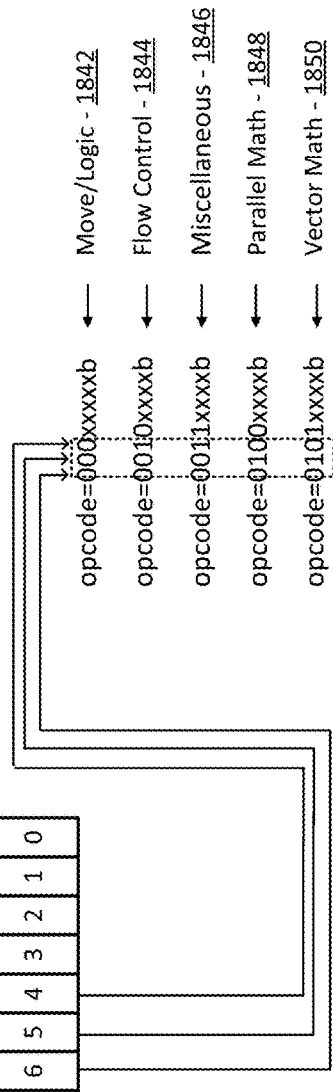
FIG. 18

FIG. 20A GRAPHICS PROCESSOR COMMAND FORMAT
2000
FIG. 20B GRAPHICS PROCESSOR COMMAND SEQUENCE
2010
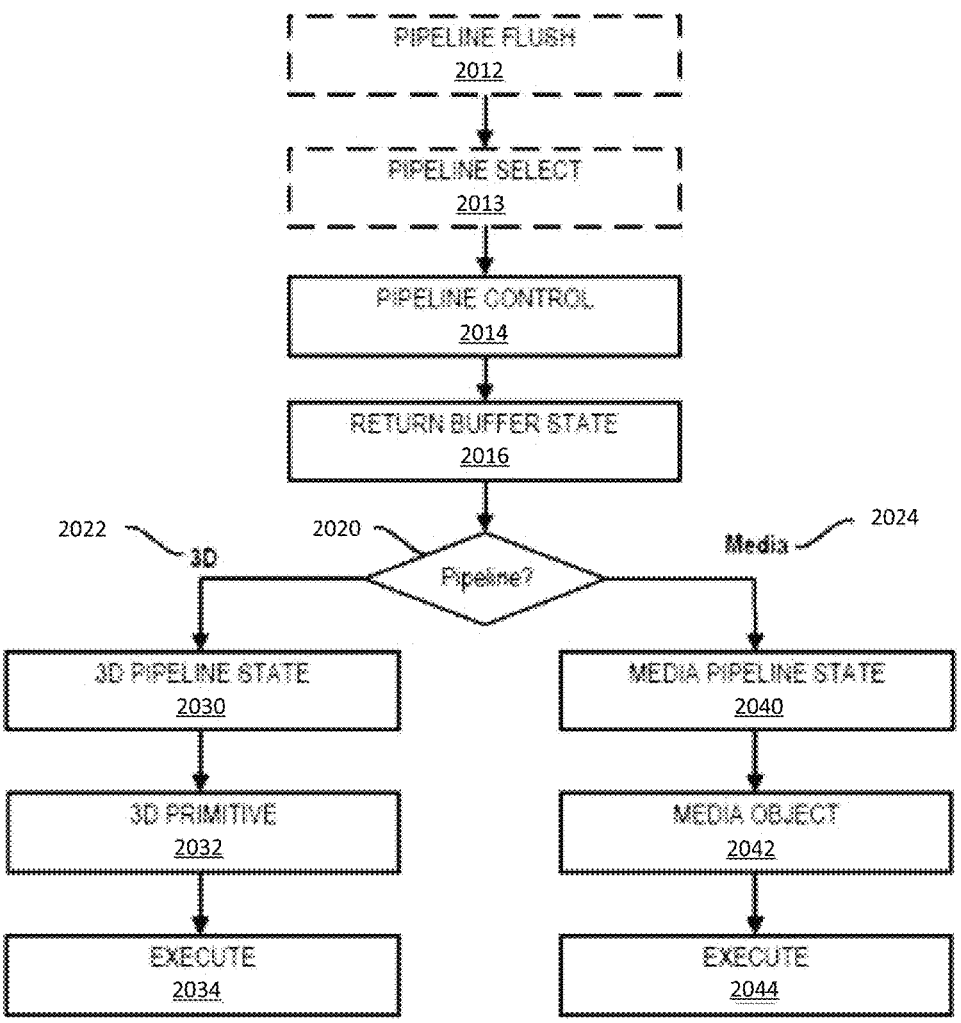

BANDWIDTH-EFFICIENT LOSSY FRAGMENT COLOR COMPRESSION OF MULTI-SAMPLE PIXELS

BACKGROUND

The quality of a rendered image is significantly improved with anti-aliasing. In computer graphics, aliasing is the process by which smooth curves and angled lines appear to be jagged because the resolution of the graphics device or file is not high enough to represent a smooth curve or angled lines. Many conventional anti-aliasing techniques exist to reduce aliasing effects (e.g., jagged lines following boundaries between pixels) in rendering a two-dimensional (2D) image of the three-dimensional (3D) object(s).

Super-sampling and multi-sampling are two common conventional anti-aliasing techniques. Super-sample anti-aliasing (SSAA) involves generating multiple samples within a pixel, where each sample is independently computed for coverage and shading. The shaded samples are stored within a frame buffer and blended for display. While super-sampling produces a very accurate and high-quality image, super-sampling is quite expensive because each pixel within a rendered image requires the computational processing of multiple fully shaded samples, and shading is typically the most expensive operation within the graphics rendering engine.

Multi-sample anti-aliasing (MSAA) techniques are a less expensive technique that uses one fully shaded color value and a coverage mask, rather than multiple fully shaded samples, to generate the multiple samples stored in the frame buffer that are ultimately blended to produce a pixel within a rendered image. This combination of a color and a sample mask is sometimes referred to as a fragment. Multi-sampling is commonly used because of the substantial cost-versus-performance benefit that is typically achieved without a significant loss in overall image quality. Although multi-sampling saves shader processing relative to super-sampling, multi-sampling still requires a frame buffer with multiple samples per pixel and the attendant bandwidth, which can limit application performance.

A common method to reduce the memory bandwidth required by multi-sample anti-aliasing is referred to as color fragment compression. Instead of replicating the fragment color to each sample marked in the fragment's sample mask, fragment compression stores the fragment colors and their sample masks. As a result, if a color covers N samples, it only needs to be accessed once (along with the coverage information) instead of N times. The coverage information is typically encoded as a fragment number per sample and is usually stored in a separate array called a control plane. If there are four samples per pixel, the control plane stores four 2-bit codes per pixel.

With the goal of improving on MSAA (esp. regarding anti-aliasing and bandwidth/storage performance), NVIDIA Corporation introduced CSAA (coverage sampling anti-aliasing), and AMD introduced EQAA (enhanced quality anti-aliasing). Each of these extends MSAA. CSAA and EQAA augment the normal samples with additional coverage samples, which do not store color, depth or stencil values, but rather a link to one of the normal samples. The number of fragment colors that can be represented is limited to the number of normal samples, but anti-aliased coverage is computed based on the total number of normal plus coverage samples. This results in quality similar to MSAA with the total number of samples, provided that not too many triangles or other primitives overlap the pixel.

BRIEF DESCRIPTION OF THE DRAWINGS

FIGS. 6A-B illustrate examples of formats of a memory footprint for a 8× multi-sample pixel in accordance with lossy compression implementations as described herein.

FIG. 10 shows an example of a format that encodes a 2×2 block of multi-sample pixels that each have 4 normal samples and 12 coverage samples per pixel in accordance with one or more implementations of the technology described herein.

FIGS. 11A and 11B show examples of pixel-quad formats that are specialized formats designed to encode data (e.g., color) under these common cases of a small number of fragments covering the pixel block in accordance with one or more implementations of the technology described herein.

FIG. 18 is a block diagram illustrating a graphics processor execution unit instruction format according to an embodiment.

FIG. 20A is a block diagram illustrating a graphics processor command format according to an embodiment and FIG. 20B is a block diagram illustrating a graphics processor command sequence according to an embodiment.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
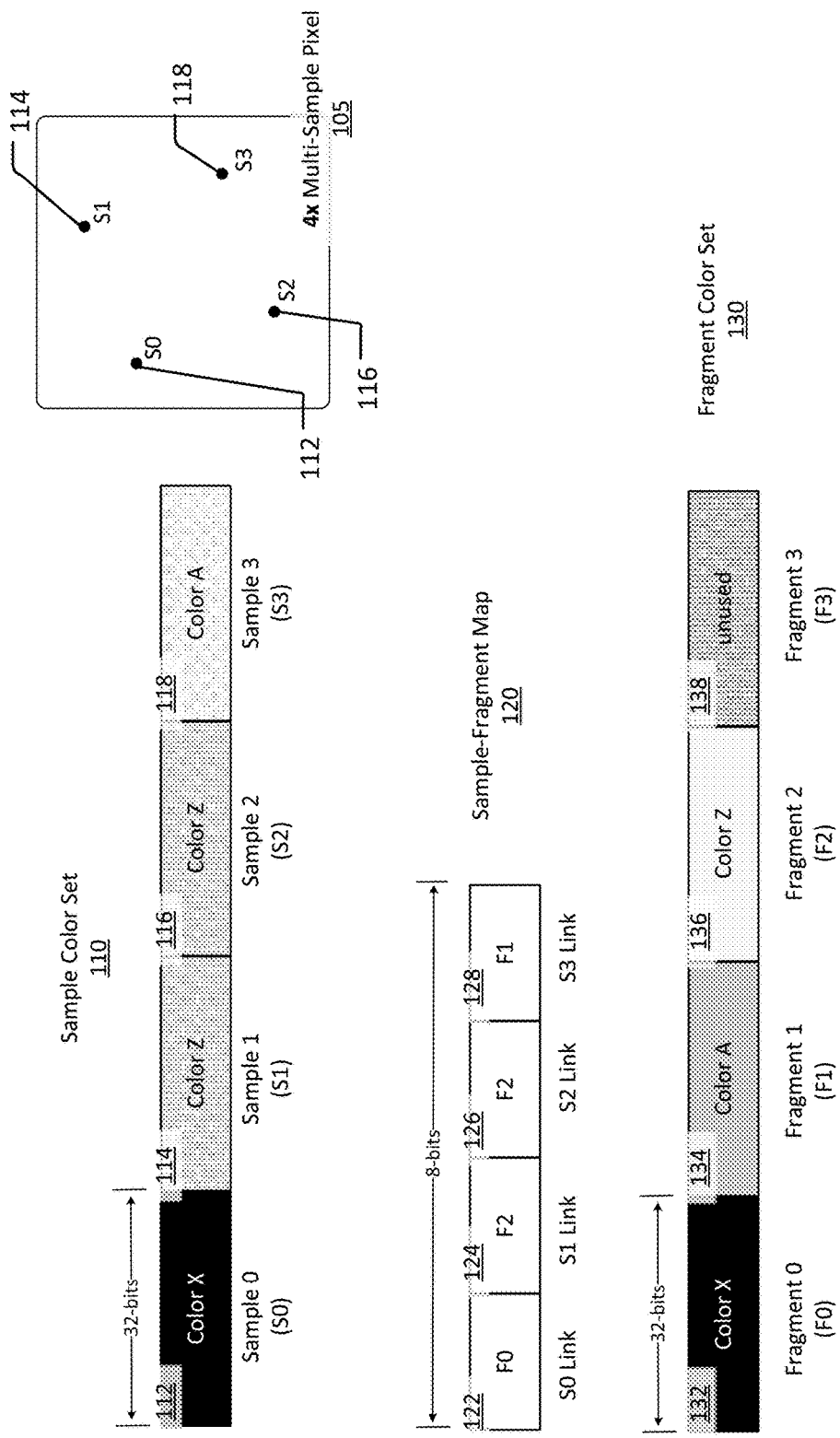
FIG. 1 illustrates an example of a 4× multi-sample pixel and its accompanying memory footprint in accordance with conventional fragment color compression techniques.

Described herein are technologies to facilitate lossy compression for multi-sample color data of computer graphics that maximizes the apparent quality of pixels while avoiding a corresponding burden on memory and processor bandwidth. The technologies described herein provide high-quality multi-sampling for typical pixels, which have a small number of objects visible in the pixel, and guaranteed minimum quality for complex pixels, which have a large number of 3D objects visible in the pixel. The technologies described herein do not cause the visibility errors that can result from lossy MSAA compression methods such as CSAA, and also unlike CSAA, the results are not dependent upon tessellated triangle order. Results also do not depend on when caches are flushed.

Color multi-sampling stores multiple per-sample color values in each pixel. Typically, all of the samples rendered from the same primitive (e.g., triangle) are set to the same color. Typically, fragment compression stores only the unique color values in each pixel, together with mapping data that specifies which fragment color is associated with each sample. The techniques described herein maximize the apparent quality of multi-sample pixels while avoiding the burden on memory bandwidth and footprint of storing and accessing a large number of mapping bits per pixel.

Super-Sampling

The quality of a rendered image is significantly improved with anti-aliasing. In computer graphics, aliasing is the process by which smooth curves and angled lines appear to be jagged because the resolution of the graphics device or file is not high enough to represent a smooth curve or angled lines. Many conventional anti-aliasing techniques exist to reduce aliasing effects (e.g., jagged lines following boundaries between pixels) in rendering a two-dimensional (2D) image of the three-dimensional (3D) object(s).

The simplest sampling-based anti-aliasing approach performs all of the necessary rendering calculations on all of the samples (e.g., 16 samples per pixel) for each pixel of an image. While this is highly effective at removing aliasing artifacts, it is impractical. It is expensive regarding computational and memory resources. It increases the pixel shading, rasterization, memory bandwidth, and memory capacity requirements many times per sample. The conventional techniques where all computations are carried out for each sample in this fashion are called super-sample anti-aliasing (SSAA).

Super-sampling involves generating multiple samples within a pixel, where each sample is independently computed for coverage and shading. The shaded samples are stored in a frame buffer and blended for display. While super-sampling produces a very accurate and high-quality image, super-sampling is quite expensive because each pixel within a rendered image requires the computational processing of multiple fully shaded samples, and shading is typically the most expensive operation in the graphics rendering engine.

Typically, in SSAA, a selected number of samples per pixel of the final 2D image is selected (e.g., 2, 4, 8 or 16), and that number of samples are computed for the 3D object(s) for each pixel within the image plane of the final 2D image. Each sample specifies a color and other data associated with the pixel to which that sample belongs. The various colors of the samples of each pixel are employed to derive the colors given to each pixel in the final 2D image.

Unfortunately, SSAA techniques are demanding of both memory and processor bandwidth since an entirely separate color data value is always computed and stored for each sample. To gain the benefits of sampling at a finer resolution without such high memory/processor bandwidth requirements, conventional multi-sampling anti-aliasing (MSAA) techniques are used.

Uncompressed Multi-Sampling

Multi-sample anti-aliasing (MSAA) techniques offer an improvement over SSAA. Unlike the SSAA case, when processing a 3D object, only a single color is computed for each pixel overlapped by the object. That color is used for all samples in the pixel that are covered by the 3D object. But the coverage is computed once per sample, allowing for the same anti-aliasing quality regarding geometry edges as SSAA. This dramatically reduces the computation required for anti-aliasing but does not reduce the memory bandwidth requirement. Multi-sampling is commonly used because of the substantial cost-versus-performance benefit that is typically achieved without a significant loss in overall image quality.

Multi-sample fragment compression reduces the memory bandwidth required for MSAA. Instead of replicating the fragment color to each sample marked in the fragment's sample mask, fragment compression stores the fragment colors and their sample masks. As a result, if a color covers N samples, it only needs to be accessed once (along with the coverage information) instead of N times. The coverage information is typically encoded as a fragment number per sample and is usually stored in a separate array called a control plane.

MSAA techniques are classified based on the number of samples designated per pixel. Theoretically, the higher the resolution of the MSAA technique, the better it is as anti-aliasing. Thus, it is better quality. A 2×MSAA has two samples per pixel. A 4×MSAA has four samples per pixels. 8× and 16× MSAA is also used, though above that number of samples there is typically very little perceived quality improvement from using more samples.

Not surprisingly, the improved quality comes at the cost of increased memory bandwidth demands, even with the benefits of MSAA fragment compression. Also, fragment compression does not reduce the memory footprint but instead increases it due to needing to store mapping data.

4×MSAA is commonly used as a balance between the benefit of increasing visual quality and the cost of increased memory bandwidth and memory footprint, although aliasing artifacts are still clearly visible. 4×MSAA also balances the amount of metadata required, which is N*log(N) bits per pixel. For 4-sample, this is 8 bits per pixel. For 8-sample, this increases to 24-bits per pixel of metadata, which usually is stored as 32-bits because of the complexity of accessing memory words that are not a power of two in size.

A pixel is simply a colored dot of a computer graphics image or frame that will ultimately be displayed on a screen. A multi-sample pixel (MS-pixel) is a pixel that has multiple (e.g., 2×, 4×, 8×) sample values (e.g., color) associated with it. Unless the context indicates otherwise, presume the term "pixel" used herein is a multi-sample pixel (MS-pixel) of computer graphics.

Fragment Compression

When rendering 3D objects for display, each object is divided into a series of "fragments" that each represents the portion of the object that overlaps a specific pixel, together with a list or mask of which samples in the pixel that the object overlaps. A particular fragment is associated with a pixel if that fragment covers or at least partially covers the pixel. Fragment coverage is computed after various clipping operations are applied to the object and may or may not be applied after depth testing eliminates certain samples from set that are covered by the fragment. A single fragment color is used for all samples that the fragment covers.

To reduce the memory bandwidth requirements, conventional MSAA-based fragment compression techniques have been introduced. These techniques take advantage of the fact that a pixel typically is covered by only a small number of visible 3D objects, and therefore typically contains many samples with duplicate colors. This occurs because MSAA typically computes a single color per fragment (the portion of a 3D object that overlaps a pixel) and uses that color for all covered samples.

Conventional MSAA-based fragment compression typically involves storing metadata that specifies which fragment color to use for each sample position. Typically, this is stored in a separate memory array called a control plane that stores the mapping of samples to fragment colors for each pixel.

Conventional approaches store the mapping data as metadata within an array referred to as a control plane. For N samples, specifying the mapping from fragments to samples requires a fragment number per sample, which requires N*log(N) bits. For example, 8-sample fragment compression requires 24 mapping bits, which is typically stored as 32 metadata bits. This metadata must be read before accessing the fragment color data and then written if the fragment coverage is modified. The read-write of this data occupies a significant amount of the bandwidth required to access a compressed fragment pixel.

Also, conventional approaches allow block-based lossless compression for color data but do not support using it with the fragment coverage mapping data. This technology described herein provides an efficient way to allow fragment compression and block-based lossless compression to be used in parallel, including compressing the mapping data.

FIG. 1 illustrates an example of a conventional fragment compression. This example includes an example 4× multi-sample pixel 105. This pixel 105 has four samples, which are labeled Sample 0 (S0 or 112), Sample 1 (S1 or 114), Sample 2 (S2 or 116), Sample 3 (S3 or 118).

For this example, the color values have a depth of 32-bits. The 32-bit sample color set 110 are stored in memory. This is how conventional MSAA techniques handle the colors of samples without regard for fragments. The discussion below introduces particular components of the conventional lossless fragment color compression techniques. It introduces the use of metadata for sample-fragment mapping and fragment color values.

Conventional multi-sample fragment compression stores only the unique per-triangle colors per pixel, together with a mapping of which fragment color to associate with each sample position. The sample-fragment map 120 is an example mapping of which fragment color is associated with each sample position.

For this pixel 105, there is a metadata memory block called sample-fragment map 120. For this example, the sample-fragment map 120 is 8-bits in size and is divided into four equally sized storage segments: S0 Link 122, S1 Link 124, S2 Link 126, and S3 Link 128. Of course, other versions may use a different number of bits for the sample-fragment map. Each segment is associated with a particular sample of pixel 105. For example, segment 122 is associated with sample 0 (i.e., S0). The value of segment 122 is a link to F0, which is segment 132. Rather than storing a color value, each storage segment of the sample-fragment map 120 stores a link, reference, or pointer to entry (i.e., segment) in a fragment color values 130.

The conventional approach for lossless fragment compression method replaces the sample color set 110 with a "fragment color set" 130. Like 110, it has four storage segments (e.g., 132, 134, 136, and 138). In both cases, each storage segment is designed to store a color value.

As depicted, F0 (132) has a designated color value of "Color X," F1 (134) has a designated color value of "Color A," F2 (136) has a designated color value of "Color Z," and F3 (138) has a no defined color value, since that fragment is not used to specify the colors of samples in the pixel. These fragment values and colors are for illustration purpose only. They are designed to illustrate a fragment compressed representation in 120 and 130 that results in the same color at each sample in pixel 105 as are illustrated in 110.

The conventional approach for lossless fragment compression of multi-sample color data takes advantage of the fact that typically multiple samples per pixel have the same color. The example in FIG. 1 shows three distinct fragment colors in the pixel for purposes of illustration. It is quite common for a pixel to be either entirely inside a triangle, in which case one fragment color is used for all of the samples, or on the edge between two triangles, in which case two fragment colors cover all of the samples. Typically more than two fragment colors are required only when a vertex of a triangle strip or mesh falls within the pixel.

Theoretically, the conventional multi-sample fragment compression approach reduces memory bandwidth compared to always storing a color per sample, since the average number of unique fragment colors per pixel is quite low.

However, that actual bandwidth reduction realized is much less in practice. One reason is that the memory access unit is larger than the pixel size. For example, it is common for modern CPUs to access memory in 64B memory units, each of which stores 16 32-bit pixels. Because of this, if a single memory unit stored all of the fragment colors for a single pixel, then there would be no benefit to fragment compression. A common conventional alternative is for a memory unit to store the same fragment color for each of a block of pixels. This way, the number of accesses is determined by the maximum number of fragment colors in that block.

Another reason the actual bandwidth reduction realized is much less in practice is because conventional multi-sample fragment compression approaches need to read and write the sample-fragment map 120. This adds bandwidth relative to just reading the sample colors 110 or fragment colors 130. In some cases, the difference is quite large.

Consider, for example, a block of 8×MSAA pixels that each needs to be written with one 32-bit fragment color that fully covers the pixel. In this scenario, there is an 8:1 improvement in the memory bandwidth when accessing the fragment color. That is, an approach that does not use conventional fragment compression would need to access the color value (such as those of sample color set 110) for each of the eight samples of the 8× multi-sample pixel rather than the one color value of the sole fragment covering all of the samples in this scenario.

However, this is not the full picture of bandwidth needs. Reading this pixel requires reading the sample-fragment map 120, and changing the pixel in any way requires writing the sample-fragment map 120 metadata. For 8×MSAA, there need to be eight entries in the sample-fragment map, each of which must store at least log(8)=3 bits to select the fragment per pixel. Typically, this 24-bit sample-fragment map is stored as 32-bit values. So, for a write-only operation, this scenario has changed eight 32-bit writes per pixel (without fragment compression) to one 32-bit read (of the sample-fragment map 120) and two 32-bit writes per pixel (which includes writing a new color in the fragment color set 130 and writing an update to the map 120). So, the apparent improvement in the reduction of bandwidth drops from theoretical 8:1 to the more realistic 8:3 or 2.67:1.

CSAA and EQAA

With the goal of improving on MSAA (esp. regarding anti-aliasing and bandwidth/storage performance), NVIDIA Corporation introduced CSAA (coverage sampling anti-aliasing), and AMD introduced EQAA (enhanced quality anti-aliasing). CSAA and EQAA improve anti-aliasing over MSAA by introducing additional coverage samples, which do not store color, depth or stencil values, but rather a link to one of the normal samples. Meta-data bits specify which links are valid. The number of fragment colors that can be represented is limited to the number of normal samples, but anti-aliased coverage is computed based on the total number of normal plus coverage samples. This results in quality similar to MSAA with the total number of samples, provided that not too many triangles or other primitives overlap the pixel.

Figure 2:
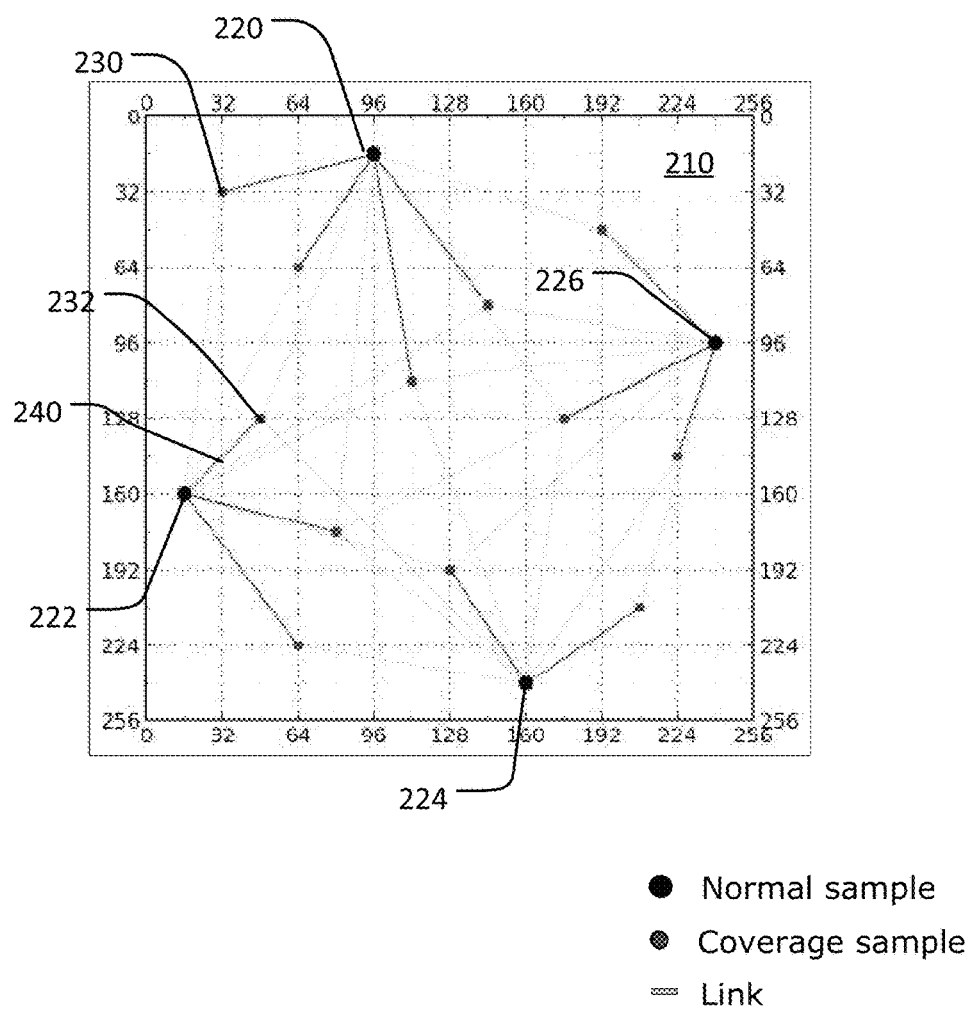
FIG. 2 illustrates an example of a conventional CSAA pixel with sixteen samples.

FIG. 2 illustrates an example CSAA pixel 210 with sixteen samples. The example pixel 210 uses a CSAA 4+12 pattern. That pattern includes four (4) normal samples (220, 222, 224, 226) and twelve (12) coverage samples (e.g., 230, 232). In this example, the normal samples represent the MSAA samples for a 4× multi-sample pixel. The grid of coverage plus normal samples (e.g., 230 and 232) is of higher resolution than the grid of normal samples used by MSAA (e.g., 220 and 222) and so provides a higher resolution indication as to if a part of a given pixel is covered by a given primitive. These coverage samples are used together with the normal samples to compute a single color for the pixel, in much the same way as if the pixel were represented by that number of normal samples.

Links are used to specify what fragment color to use for the coverage samples, by associating samples that are covered by the same triangle. Each coverage sample (e.g., 232) is linked to one or more of the normal samples (e.g., 222) and to zero or more other coverage samples. Line 240 is a visual representation of such a link. The lines represent all of the possible links. For this example, this pattern requires at least 24 bits per pixel to store the links, in addition to the bits that are necessary for fragment compression.

Links are broken, that is, the associated link bit is set to zero, when two samples are not covered by the same triangle. For example, suppose a triangle covers samples 220, 222, and the seven coverage samples directly linked to them. In that case, the links between those samples would be preserved, including links between the coverage samples in that set. However, links would be broken from that set of samples to all other samples. By this means, coverage samples are associated with a fragment color if they have a link or a sequence of links that connects them with a normal sample. This is not always the case, however. For example, a triangle may not cover a normal sample, in which case the coverage samples it covers aren't linked to any normal sample. In this case, the CSAA method treats the coverage sample as being connected to a nearly normal sample. The result is that coverage samples may not have the correct color. The color at a coverage sample can depend on the order in which triangles are rendered. Combined with depth testing, the result can be that triangles may be visible at coverage samples where they should be occluded.

Another problem with approaches like CSAA and EQAA is the large number of meta-data bits required per pixel. Ordinary 4-sample fragment compression requires four 2-bit values per pixel. The CSAA 4+12 pattern illustrated in FIG. 2 requires an additional 24 bits per pixel to specify whether each of the links is active, for a total of 32-bits of meta-data per pixel. The result is that the CSAA 4+12 pattern has the same performance limitations as normal 8× color fragment compression. Similar considerations apply to other CSAA and EQAA patterns. In each case the additional bits per pixel required by the links increases the memory bandwidth required, which is a particular burden for the common case when only one triangle covers the entire pixel.

Improved Lossless Fragment Compression

One or more implementation of the technology as described herein offers new and improved lossless fragment color compression techniques that eliminate much of the bandwidth loss of accessing the sample-fragment map, as well as reducing the memory footprint required to store metadata for fragment compression. Instead of using metadata to store the mapping of fragment colors to samples, the technology described herein utilizes metadata to specify the number of fragment colors stored in each pixel or whether the pixel is stored using sample colors. In some implementations, the pixel is stored in one of two ways:

A set of fragment colors and the sample to fragment mapping data referred to as "fragment mode."
  A single color per sample, if there are too many fragment colors, referred to as "sample mode."

The technology described herein performs multi-sampled fragment compression by storing per-pixel metadata (e.g., mode tracker 340) that specifies the number of fragments per pixel. The fragment to sample mapping data (e.g., 320) is stored in the pixel fragment storage area (e.g., 330). If the mode-tracking metadata indicates so, then the pixel is stored as a color per sample (e.g., 310), which does not use the mapping data (e.g., 320).

Figure 3:
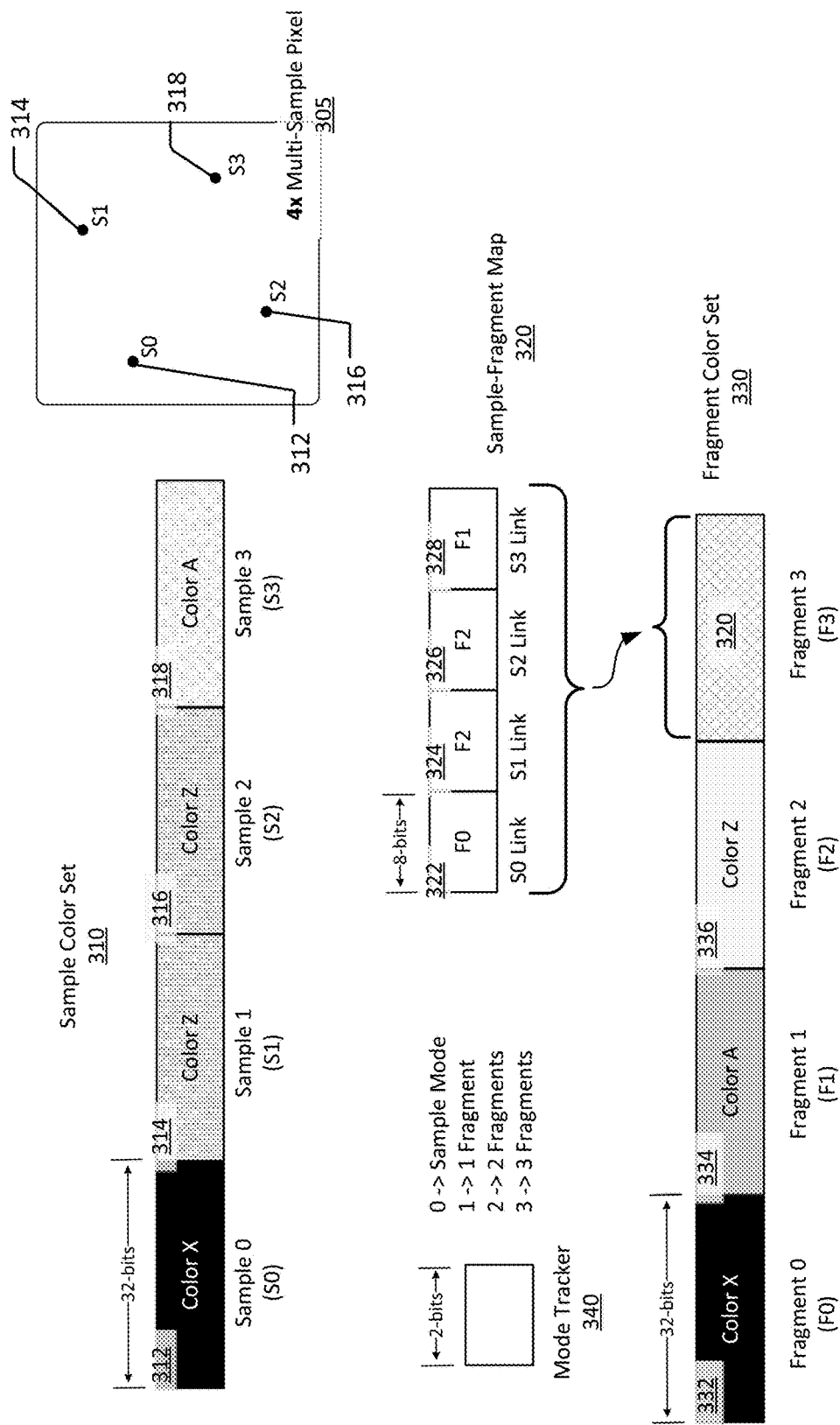
FIG. 3 illustrates an example of a 4× multi-sample pixel and its accompanying memory footprint in accordance with lossless compression implementations as described herein.

FIG. 3 illustrates an example implementation of a lossless fragment compression by the technology described herein. This example includes an example 4× multi-sample pixel 305. This pixel 305 has four samples, which are labeled Sample 0 (S0 or 312), Sample 1 (S1 or 314), Sample 2 (S2 or 316), Sample 3 (S3 or 318). In this example, sample 0 has color X, samples 1 and 2 have color Z, and sample 3 has color A.

For this example, the color values have a depth of 32-bits. The sample colors may be stored in memory as a 32-bit sample color per sample as in sample color set 310. This is how conventional MSAA techniques handle the colors of samples if fragment compression is not used. For this implementation, this is also how colors of samples are stored in memory when in "sample mode." For this pixel 305, there is a metadata memory block called mode tracker 340. When sample colors are stored for the pixel as in 310, the mode tracker value for that pixel is zero, indicating sample-mode.

Pixel 305 can instead be stored using fragment compression (in accordance with the technologies described herein). In that case, a sample-fragment map 320 is stored. As depicted FIG. 1, the sample-fragment map consists of a 2-bit fragment number 322, 324, 326 and 328 for each of the four samples. Each fragment number is associated with a specific sample in pixel 305. Other numbers of samples require a different number of map entries and a different number of bits per map entry. In this illustrative example, fragment 0 has color X, fragment 1 has color A, and fragment 2 has color Z. Also, the sample-fragment map is set to map these fragments to samples in a way that matches the per-sample colors specified in 310.

As depicted FIG. 1, the fragment color set of FIG. 3 (e.g., fragment color set 330) contains the same number of fragment color slots as sample color set (e.g., fragment color set 310) contains sample color slots. There are at least two differences from the fragment color set depicted in FIG. 1.

First, the mode tracker 340 selects whether a sample color set 310 or a fragment color set 330 are stored for each pixel, based on whether or not it specifies sample mode for the pixel. If the mode tracker 340 specifies one of the fragment modes for a particular pixel, then the fragment color set 330 is stored for that pixel. If the mode tracker 340 specifies the sample mode for a particular pixel, then the sample color set 310 is stored for that pixel Second, in the fragment modes, the sample-fragment map 320 is stored in the fragment three slots of fragment-color set 330.

Since fragment slot 3 stores the sample-fragment map, it is not possible to store four fragment colors using fragment mode. If a pixel requires four fragment colors, it is instead converted to sample-mode. This allows each of the four samples to have separate colors. When in sample-mode, the small mode tracker value per pixel is the metadata that selects between sample and fragment modes.

While this example has four sample colors, fragment colors, and map entries to support 4×MSAA, other multi-sample counts can be represented using the corresponding number of sample colors, fragment colors, and map entries, and with each map-entry equal in size to the log of the number of samples per pixel, e.g. 4-bit map entries for 16×MSAA.

With 4×MSAA, sample-fragment map 320 occupies 8-bits and, therefore, fits into the fragment three slots in fragment color set 330 for any pixel size of 8-bits or larger. 8×MSAA requires, at least, eight 3-bit sample-fragment maps entries so that sample-fragment map 320 requires 24-bits. This fits in the fragment three slots for 32-bit or larger pixels. Therefore, sample-mode is employed when there are more than three samples in these cases.

For 16-bit pixels, the sample-fragment map does not fit into fragment slot 3. Instead, it will take two slots to store the map, such as fragment slots 2 and 3. The result is that for 16-bit pixels with 8×MSAA, fragment mode can store a maximum of two fragment colors before the pixel is converted to sample mode.

In general, each number of samples has its minimum sample-fragment map size. E.g., 2×1=2 bits for 2×MSAA, 4*2=8 bits for 4×MSAA, 8*3=24 bits for 8×MSAA, and 16*4=64-bits for 16×MSAA. Depending on the pixel size, each of these cases requires reserving one or more fragment color slots to store the sample-fragment map, which limits the maximum number of fragments that can be stored before switching to sample-mode. If the sample-fragment map is too large to leave even one fragment slot unoccupied, then that combination of pixel size and samples can only be stored in sample-mode.

The mode tracker meta-data 340 does not just indicate sample mode vs. fragment mode. It also specifies the number of fragments stored in the Fragment Color Set. With this information, a CG system can limit its memory to reading only the fragment colors that are actually in use when reading from the pixel. As a result, the size of the Mode Tracker meta-data per pixel depends on the maximum number of fragments that can be stored before changing to sample-mode.

The maximum number of fragments that can be stored in each pixel depends on the number of bits of metadata (e.g., mode tracker 340), the number of samples, and the pixel size. For example, with B bits of metadata, the maximum number of fragment colors is 2B−1 fragment colors. For N-sample MSAA, the mapping data requires M=N*log(N) bits. With P bits per pixel, there are therefore be no more than N−ceiling(M/P) slots for fragment colors.

With 2×MSAA, for example, the Mode Tracker is a single bit per pixel, selecting either sample-mode or 1-fragment-mode. This size can be used for larger numbers of samples per pixel, in which case sample-mode is used unless a single fragment covers the entire pixel. A 2-bit Mode Tracker allows selecting For 4×MSAA, the Mode Tracker 2-bits, selecting sample-mode or 1, 2, or 3 fragment-mode. This is sufficient for 4×MSAA and can be used for 8× and 16×MSAA as well. To allow more than three fragment colors per pixel, 8× and 16×MSAA can use a 4-bit Mode Tracker per pixel, to specify up to 15 fragment colors in the fragment color set.

The memory footprint of 4-sample MSAA stores four sample colors per pixel, as depicted by sample colors sets 310 or the fragment color set 330 of pixel 305. The memory footprint also includes a 2-bit mode tracker value 340 per pixel. This is a significant reduction from storing the 8-bit sample-fragment map as a separate array of metadata. Even larger improvements are achieved for 8×MSAA (32-bit fragment sample map vs. 2-bit or 4-bit Mode Tracker) and 16×MSAA (64-bit fragment sample map vs. 4-bit Mode Tracker).

As a result, this new approach as described herein reduces the bandwidth requirements for conventional fragment compression, as well as reducing the required memory footprint. For example, with 32-bit pixels at 8× MSAA, reading a pixel covered by a single fragment color requires two 32-bit reads using conventional fragment compression, since the sample-fragment map is 32-bits.

With this new approach, a CG system can minimize its memory reads to acquire sufficient information to accomplish fragment compression. The CG system may read at most a 4-bit Mode Tracker and a single 32-bit word. Note that if the Mode Tracker bits indicate one fragment, it is not necessary to read the sample-fragment map. As a result, the bandwidth benefit is 2:1.125 or about 1.8:1. Writing a single color to the whole 8×MSAA pixel has an even larger benefit. Conventional fragment compression reads the sample-fragment map before the coverage is known, after which the color and the new sample-fragment map must both be written.

However, for this new technique described herein, the Mode Tracker is read and written, but the sample-fragment map does not need to be. The mode tracker (e.g., 340) is significantly smaller than the sample-fragment map. As a result, the bandwidth benefit is 3:1. 25 or 2.4:1. The benefit varies with the number of samples and the number of fragment colors.

Storing the fragment-sample map in the pixel also has a benefit when lossless block compression is combined with MSAA fragment compression. In general, lossless block compression attempts to compress fixed size blocks of memory and stores meta-data to indicate how much compression was achieved. For example, there could be two meta-data bits to select 1:1, 2:1 or 4:1 compression. Lossless block compression can be applied to MSAA data, even if fragment compressed.

However, it would be much costlier to compress the meta-data in this fashion, since that would increase the latency until the meta-data is available. Using this scheme, the Mode Tracker meta-data is small enough that further compression is not likely to be necessary. Since the fragment-sample map is stored along with the colors, lossless block compression can be used to compress both the fragment/sample colors and the mapping data (e.g., 310, 320, 330).

Example Methodological Implementation of Improved Lossless Fragment Compression

Figure 4A:
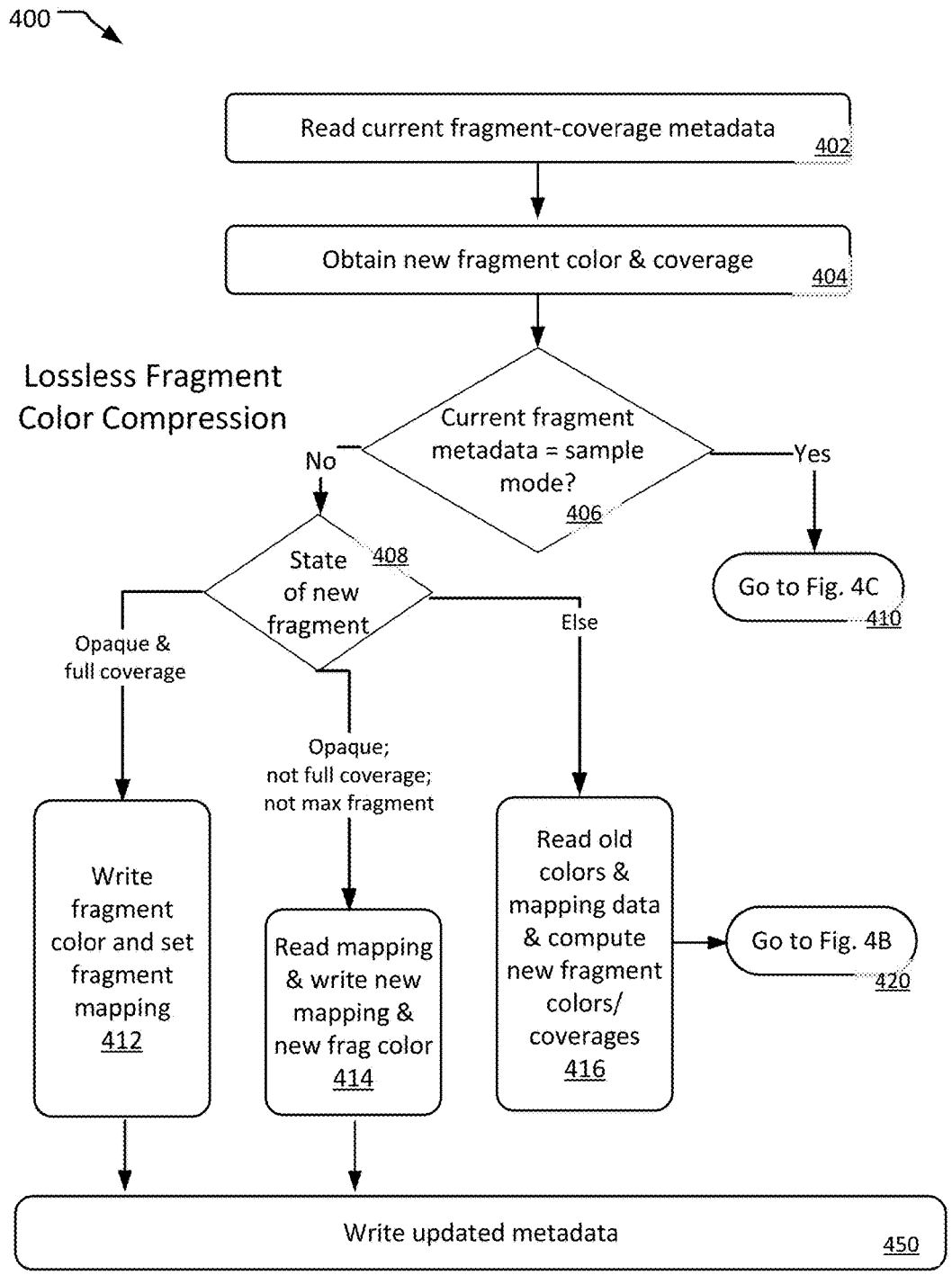
FIGS. 4A-4C illustrates an example methodological implementation in accordance with the lossless technology described herein.
Figure 4B:
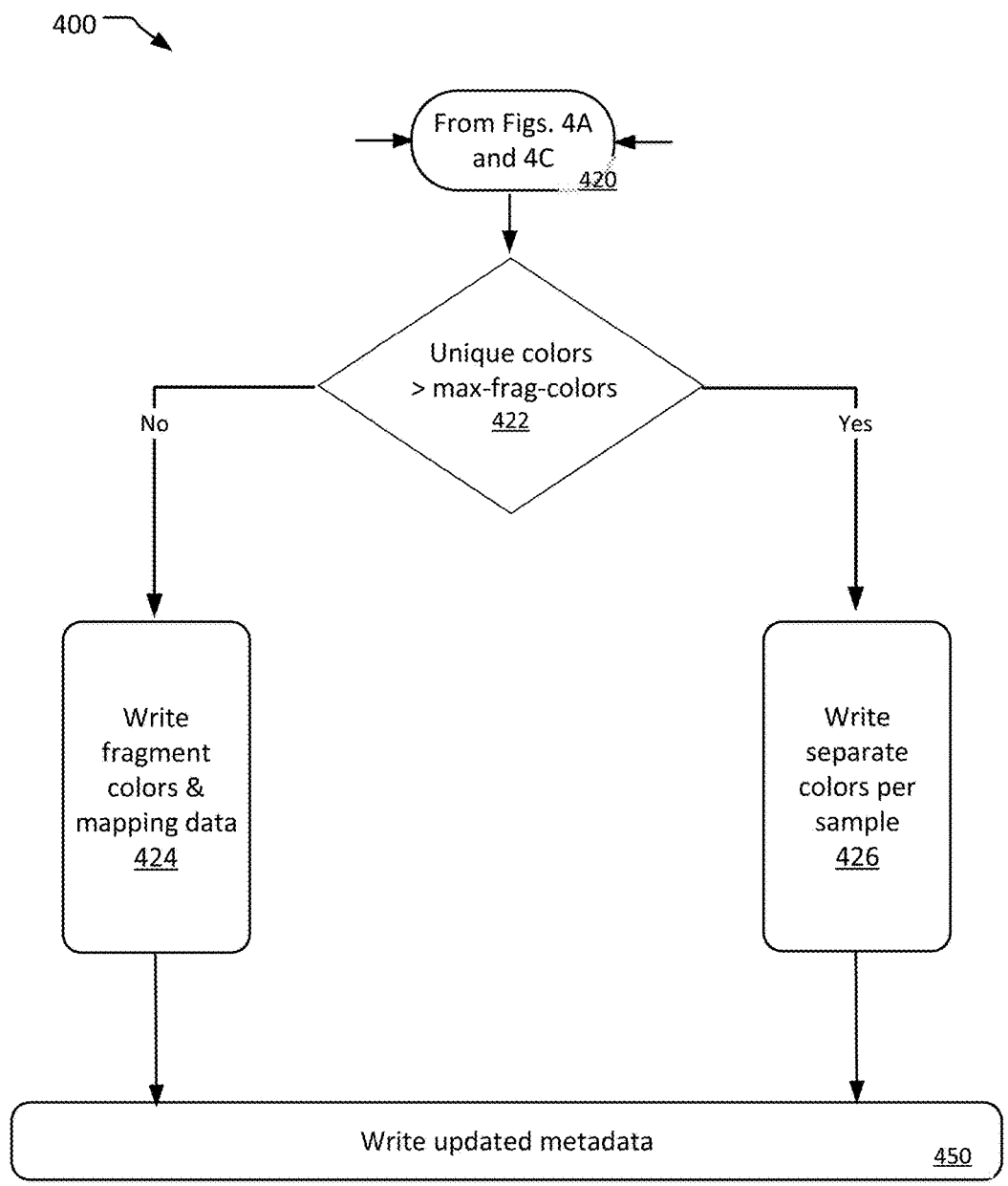
Figure 4C:
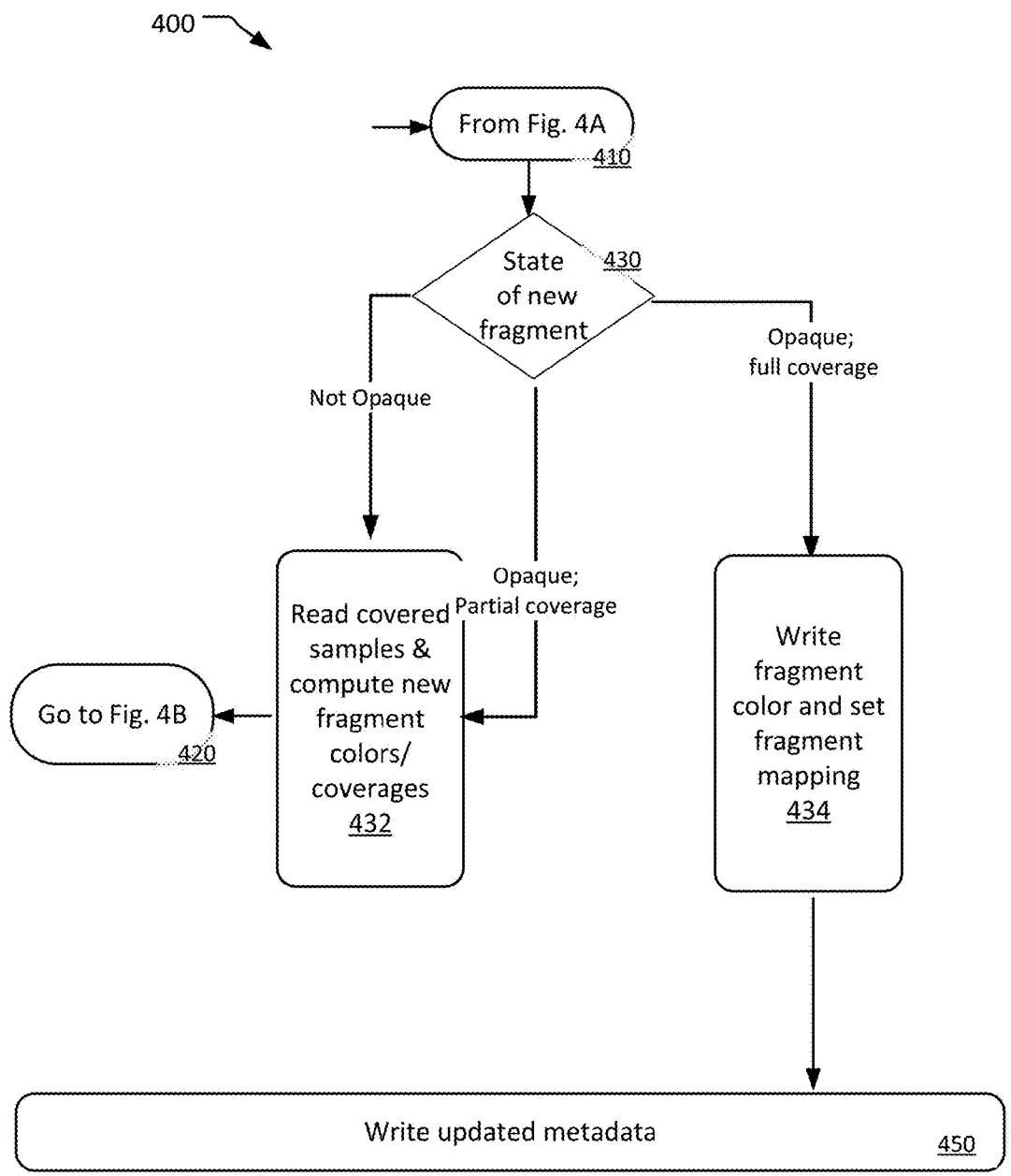

FIGS. 4A-4C show an example process 400 illustrating the technology as described herein. The example process 400 may be implemented as part of a computer graphics (CG) system. The process 400 is implemented when a new fragment is at least partially covering a multi-sample pixel. Note that the reads and writes specified as part of this process may be consolidated using caches. Caches are particularly useful for the Mode Tracker, since it uses so few bits per pixel. Also, note that simplifications of this process may also be implemented that exclude the optimized cases.

For this example process 400, the memory includes the following stored in association with a rasterized multi-sample pixel: mode-tracker metadata that includes the mode-indicator value that specifies how data is stored in the pixel; for sample mode sample data of the multiple samples of the rasterized multi-sample pixel; for fragment modes fragment data of multiple fragments that, at least, partially cover the rasterized multi-sample pixel, wherein the fragment data includes a color value for each of the multiple fragments; and for fragment modes, a sample-to-fragment map that links each sample of the rasterized multi-sample pixel to one of the fragments of the multiple fragments.

At block 402, a CG system obtains the address of a pixel that is being rendered and reads the current fragment-coverage metadata (e.g., mode tracker 340). This may also be described as the system reading a mode-tracker value from the mode-tracker metadata in the memory. The following are examples of modes that might be indicated by the fragment-coverage metadata:

0→Sample mode (separate color per sample)
1→one fragment coverage
2→two fragment coverage
3→three fragment coverage.

Of course, in other alternative implementations, the modes may vary. For example, there may be only two modes that are sample mode and one fragment mode. In another example, there may be eight modes, such as a sample mode and seven other modes that each represents coverage of one to seven fragments.

At block 404, the CG system obtains information (i.e., fragment data) regarding a new fragment that is at least partially covering the pixel. This block may also be described as including: obtaining the computed fragment color to be applied to (i.e., covers) a subset of samples of the pixel, as well as an indication of which samples the fragment color should be applied to. This block also determines whether the fragment should be applied to the pixel as an opaque or write-only operation that does not depend on the current colors of the pixel's samples, or whether a blend mode is employed.

A blend mode involves the fragment being applied to the pixel as a non-opaque or read-write operation that involves combining the new fragment color with the pixel's sample colors. A blend mode combines a new color into existing colors rather than overwriting or replacing them. Examples of blend operations include adding the two colors, taking the minimum or maximum, or other arithmetical operations that are known in the art.

Some implementations may perform the actions of blocks 402 and 404 in that particular order because of the relative time it takes to perform the actions of each block. For example, the memory latency of reading the metadata (of block 402) may occur during the obtaining (e.g., computing) the new fragment (of block 404).

Other implementations may obtain coverage information prior to performing the actions of block 402. This may occur for example on a clear operation that uses full pixel coverage for every pixel that is touched, but could also occur in other cases. If the operation is known to be write-only to all samples of the pixel prior to performing block 402, then a further optimization is available that is not shown in FIG. 4. In such a case processing can skip directly to block 412 and write the fragment color.

At block 406, the CG system determines whether the current pixel is in sample mode. This determination is based upon the current fragment-coverage metadata (e.g., mode tracker 340) as read in block 402. If it is in sample mode, the process 400 proceeds to block 410, which represents a continuation of the process 400 as depicted in FIG. 4C. If the CG system does not determine that the current coverage is sample mode (thus, it is in fragment mode), then the process 400 proceeds to block 408.

At block 408, the CG system determines whether the new fragment fully covers the pixel, that is, the fragment covers all samples in the pixel, and whether the fragment operation is opaque, that is, it doesn't depend on the current contents of the pixel. If both conditions are true, then the process 400 continues to block 412.

At block 412, the CG system writes the color of the new fragment in a manner that indicates that that this color of this new fragment covers all of the samples of the pixel. For example, it may write "color X" into the fragment 0 slot (332) of fragment color set 330. If the fragment mapping is tracked by internal logic, it is set to indicate that one fragment covers all samples of the pixel, but no fragment mapping data needs to be written to memory. Then, at block 450, the CG system updates the fragment-coverage metadata (e.g., mode tracker 340) accordingly. For example, it writes a binary value of "01" to indicate one fragment covers all of the samples of the pixel 305. At this point, process 400 is done for this new fragment.

Described in another way, at block 412, the CG system writes the color of the new fragment of the pixel, and it sets the mapping mode to indicate one fragment coverage (e.g., 1-fragment mode). The actions of blocks 412 and 450 when the state is opaque and fully covered produces a subsequent efficiency and effectiveness concerning metadata access. With conventional approaches, in a similar situation as depicted in block 412, the system must read and write the full sample-to-fragment map, instead of reading and writing the much smaller Mode Tracker metadata as in this one or more implementations of the technology described herein.

Also, with conventional approaches, the entire sample-to-fragment map must be read for subsequent reads of the pixel. But with this new approach and in this situation, the CG system knows that the pixel is in a 1-fragment mode (based upon reading the mode tracker 340). Because of this, the system only needs to read the fragment color entry (e.g., slot 332) and does not need to read any fragment mapping data entry (e.g., 320). This is a benefit over traditional fragment compression, where the Sample to Fragment Mapping bits need to be read to discover that the pixel is covered by a single fragment color.

At block 408, if the CG system determines that fragment operation is opaque, but the new fragment does not fully cover the pixel, it then checks whether the Mode Tracker is set to the maximum allowed number of fragments (i.e., "max-frag"). If so, the process proceeds to block 414. This max-frag value is set in a configuration and is determined by the minimum of the number of fragments that can be specified in the Mode Tracker and the maximum number of fragments that can be stored in the Fragment Color Set (e.g., 330) along with the necessary sample-to-fragment mapping data. For this example, the maximum number of fragments is three.

At block 414, the CG system reads mapping. It also writes new mapping and new fragment color. As part of this block, the CG system reads the Fragment to Sample Mapping, then writes the new fragment color to the first unused fragment slot in the fragment color set. There is guaranteed to be an unused slot since the Mode Tracker isn't set to max-frag. The new sample-to-fragment mapping is then written out based on the samples covered by the new fragment and the slot the new fragment color was written to. Block 450 then writes the new Mode Tracker with the new number of fragments. This case requires equivalent memory bandwidth as traditional fragment compression but still has an advantage in memory footprint Thus, at block 414, the system writes the color of the new fragment in a manner that indicates that that this color of this new fragment covers some of the samples of the pixel. For example, the CG system may write "color A" into the fragment two slot (336) of fragment color set 330 and writes the new sample-to-fragment mapping into fragment slot 3 (320). Then, at block 450, the CG system updates the fragment-coverage metadata (e.g., mode tracker 340) accordingly. For example, it may write a binary value of "11" to indicate three fragments cover the samples of the pixel 305. At this point, process 400 is done for this new fragment.

If block 408 determines that the fragment operation is non-opaque, or else the new fragment does not cover all of the samples and the pixel's Mapping Mode is the maximum allowed a number of fragments, then block 316 is performed. This block reads all of the pixels' fragment colors and the Sample to Fragment Mapping data and computes the new fragment colors and coverages. That is, at block 416, the CG system reads the existing (i.e., "old") colors and mapping data. For example, the CG system reads all of the data of the fragment color set 330, including the sample-to-fragment map 320.

After reading all of the data from the pixel being rendered, block 414 then performs a specified rendering operation, such as blend mode when the fragment coverage information is used to combine the new fragment color the covered sample colors. This will have the same result as if the pixel is converted to a single color per sample and then rendered as for normal supersampling, after which the samples with the same final color are gathered into fragments. Other implementations of the technology described herein may use other known approaches to perform this step on the fragment data that is stored in the pixel without first converting the pixel to a color per sample. Then, the process 400 proceeds to block 420, which represents a continuation of the process 400 as depicted in FIG. 4B.

FIG. 4B depicts a portion of process 400 handles the general case of fragment color processing. The logic of this portion combines the new fragment color with the color per fragment or sample of the current pixel and determines the number of unique colors required to represent the result. The number of unique colors may be any number from 1 to the total number of samples stored in the pixel.

This portion of process 400 may be triggered block 416 when the state of the new fragment is neither fully covering the samples nor opaque, and/or the pixel is not at max-frag state. Also, this portion of process 400 may be triggered from 432 when the state of the new fragment is either not opaque or partially covering.

At block 422, the CG system compares the number of fragment colors generated in block 416 (i.e., "resulting fragment colors") to the maximum allowed number of fragment colors (i.e., "max-frag-colors"). The max-frag-colors may be designated by a configuration setting but cannot be larger than the maximum number of fragment colors that can be specified for a given combination of the bits per Mode Tracker value and the bits per pixel. If the number of resulting fragment colors exceeds the max-frag-colors value, then block 426 is performed. Otherwise, the actions of block 424 are performed.

At block 426, the CG system uses the fragment colors and masks resulting from block 416 to write out a separate color per sample and sets the Mode Tracker to sample-mode for this pixel. Then, at block 450, the CG system updates the fragment-coverage metadata (e.g., mode tracker 340) accordingly. At this point, process 400 is done for this new fragment.

At block 424, the CG system writes out the resulting fragment colors to the pixel along with Sample to Fragment mapping data, and sets the Mapping Mode to a fragment mode for the number of fragment colors written to the pixel. If the pixel is currently in fragment mode and some of the colors were not changed, they may not need to be written back to the pixel. Then, at block 450, the CG system updates the fragment-coverage metadata (e.g., mode tracker 340) accordingly.

FIG. 4C depicts a portion of process 400 that occurs when the current Mode Tracker of the pixel specifies that it is stored in sample mode. This may occur, for example, when the value of mode Tracker 340 has a binary value of 00.

At block 430, the CG system tests the state of the new fragment (based on the information obtained with block 404). The possible states include "not opaque," "opaque; partially covered," or "opaque; fully covered." That is, the CG system determines whether the fragment operation is opaque and whether the new fragment fully covers the pixel.

If the state is "opaque; fully covered," then the process proceeds to block 434. That is, if the CG system determines that the new fragment fully covers the pixel and the fragment operation is opaque, then it performs the actions of block 434. In this situation, there is now only one fragment, which is the new one, covering all of the samples of the pixel.

At block 434, the CG system writes the color of the new fragment of the pixel, and it sets the mapping mode to indicate one fragment coverage (e.g., 1-fragment mode). For example, the system writes color X in F0 slot 332. If an internal copy of the sample-to-fragment mapping is stored, it is set to specify that all samples use fragment F0 (slot 332), but this value does not need to be written to memory. Then, at block 450, the CG system updates the fragment-coverage metadata (e.g., mode tracker 340) accordingly. For example, it writes a binary value of "01" to indicate one fragment covers all of the samples of the pixel 305. At this point, process 400 is done for this new fragment.

With conventional approaches, the entire sample-to-fragment map of a pixel must be read and then written in this situation, as well as writing the new fragment color. But with this new approach in this situation, the CG system only needs to write the one fragment color entry (e.g., slot 332) and the Mode Tracker (e.g., 340). This can significantly reduce the memory bandwidth required in this common situation of writing an opaque fragment that fully covers a pixel.

If the state of the new fragment is "not opaque" or "opaque; partial coverage," then the process proceeds to block 432, and the CG system reads the covered samples and then computes updated fragment colors and their coverages according to the new fragment coverage and a specified blend operation. That is, if the CG system determines that the new fragment either only partially covers the pixel or that the fragment operation is non-opaque, then the system reads (at block 432) the sample color data stored in the pixel.

The system then uses the fragment color and coverage being rendered to modify the color at each sample and produces a set of fragments, each of which specifies a sample color and a sample to fragment mapping that selects that fragment for its sample. If some of the samples store the same color, e.g. in the opaque partial coverage case, then this step may combine those samples into a single fragment. Then, the process 400 proceeds to block 420, which represents a continuation of the process 400 as depicted in FIG. 4B.

Lossy Fragment Compression

Described herein are technologies to facilitate lossy compression for multi-sample color data of computer graphics that maximizes the apparent quality of pixels while avoiding a corresponding burden on memory and processor bandwidth. The technologies described herein provide high-quality multi-sampling for typical pixels, which have a small number of objects visible in the pixel, and provide a guaranteed minimum quality for complex pixels, which have a large number of 3D objects visible in the pixel. The technologies described herein do not cause the pop-through artifacts that can result from lossy MSAA compression methods such as CSAA, and also unlike CSAA, the results are not dependent upon tessellated triangle order. Results also do not depend on when caches are flushed.

As a result of the new technologies described herein, high multi-sample counts (e.g., 16×) can be supported by most multi-sample pixels (i.e., MS-pixels) of a computer graphics image while using the same or nearly the same memory resources as 4×MSAA techniques. Many applications that use multi-sampling approaches do not attempt greater than 4× because of the increased demand for memory and processing resources by the greater number of samples per MS-pixel (e.g., 8× or 16×).

Each sample of an MS-pixel has sample data associated therewith. The sample data has values that define or describe various aspects of that particular sample of its pixel. For example sample color value of the sample, and in some cases depth, stencil or other such information. This technology compresses only the color information.

When processing 3D objects for display, each object is divided into a series of "fragments" that each represents the portion of the object that overlaps a specific pixel. A particular fragment is associated with a pixel if that fragment covers or at least partially covers the pixel and is visible in depth testing. Each fragment contains a list or mask of the set of samples that fragment covers in the pixel. A single fragment color is used for all samples that the fragment covers.

Like CSAA, this technology divides the sample positions within a pixel into two groups, which are here called the normal samples and the coverage samples. This assignment is made before rendering begins and does not change during rendering. The normal samples always have a fragment color specified for them. Unlike CSAA, the coverage samples of the technology described herein are not linked to one of the normal samples. Instead, they either are assigned to a fragment color or are marked "invalid", meaning that no fragment is available for them. This feature eliminates visibility errors where the wrong color is visible at a sample, since a sample is never assigned a color that was computed for some other sample, which can happen under CSAA.

One or more implementations of the technologies described herein determine whether each of the normal samples of a pixel (or a group of pixels) are covered by a different fragment and therefore do not share the same fragment color. In this case, there is no need to store mapping information, since each normal sample has its color, which may be stored in order. A meta-data value per pixel specifies whether this is the case. In this case, the coverage samples are all marked as invalid, since there is no specified color for them.

Figure 5:
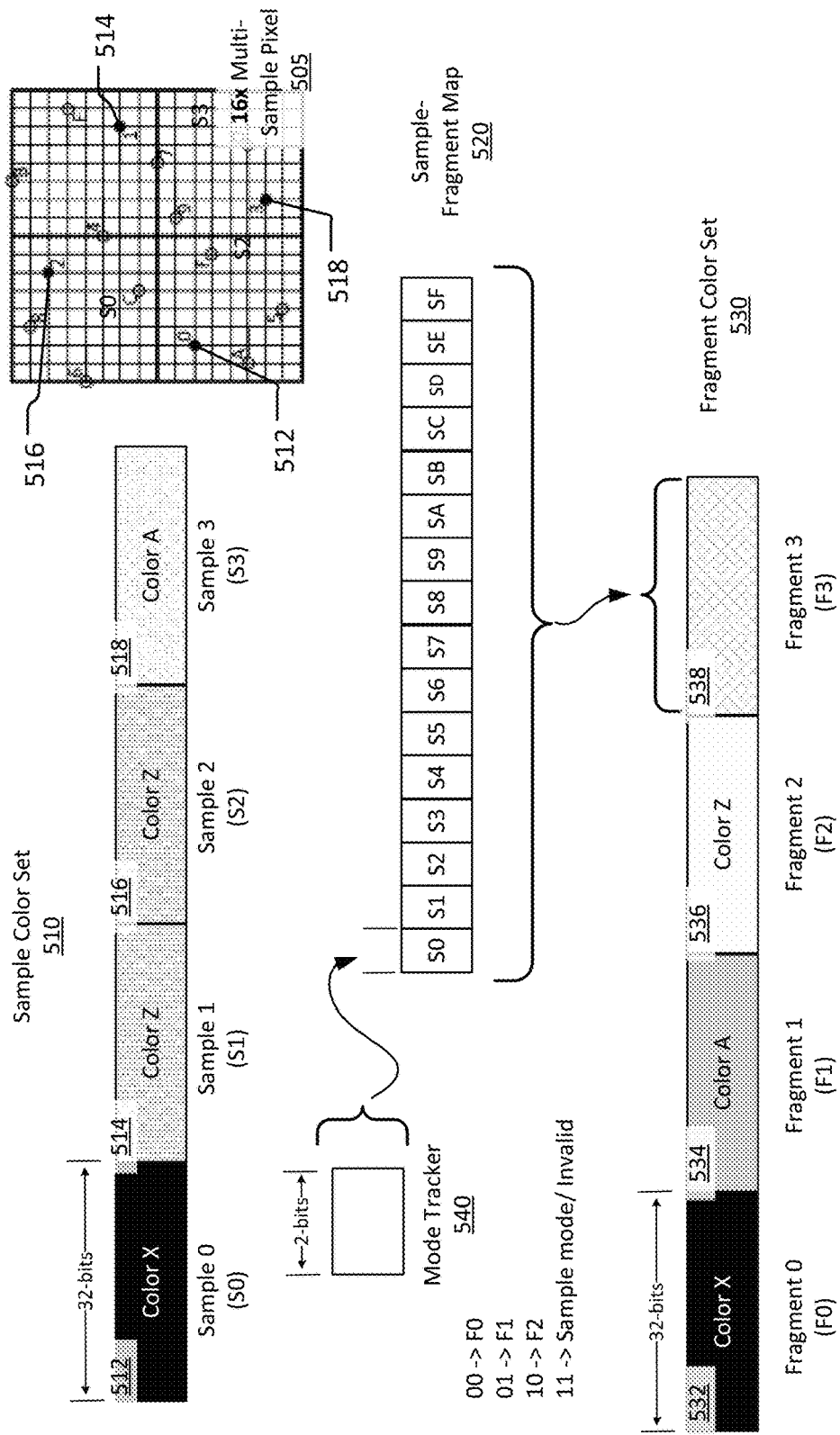
FIG. 5 illustrates an example of a 16× multi-sample pixel and its accompanying memory footprint in accordance with lossy compression implementations as described herein.

FIG. 5 illustrates an example implementation of a lossy fragment compression by the technology described herein. This example includes an example 16× multi-sample pixel 505, which is shown as a grid with four quadrants. This pixel 505 has four normal samples represented as solid dots. The normal samples are labeled Sample 0 (0 or S0 or 512), Sample 1 (1 or S1 or 514), Sample 2 (2 or S2 or 516), Sample 3 (3 or S3 or 518). Each quadrant has one normal sample therein.

This pixel 505 also has twelve coverage samples represented as hollow dots (i.e., circles). The coverage samples are labeled with numbers 4-F, which represent samples numbered 4-16 in decimal (i.e., 4-F in hexadecimal). Alternatively, these coverage samples may be referenced as S4-SF. While this labeling is useful for description purposes, it is also used to indicate the priority of the coverage samples relative to each other.

Sample color set 510 represents the storage footprint of just the four normal samples. For this example, sample 0 has color X, samples 1 and 2 have color Z, and sample 3 has color A. For this example, the color values have a depth of 32-bits. The sample colors may be stored in memory as a 32-bit sample color per sample as in sample color set 510.

This implementation includes a fragment color set 530 that contains the same number (e.g., four) of fragment color slots as sample color set 510 contains sample color slots.

However, one of the slots (e.g., 538 or F3) of the fragment color set 530 is used to store a sample-fragment map (i.e., sample-to-fragment map) 520. The remaining slots may be used to store color values of fragments when in fragment mode. The total number of fragment colors that can be stored in the remaining slots of the fragment color set is referred to as max-frag-colors.

The Sample Fragment Map 520 is similar to Sample Fragment Map 320 in FIG. 3. The difference is that in the lossless compression algorithm represented in FIG. 3, Sample Fragment Map 320 only stores a fragment number for each of four samples. In FIG. 5, Sample Fragment Map 520 stores a fragment number for each of four normal samples as well as for 12 coverage samples, for a total of 16 sample to fragment links.

If the number of fragments that cover the pixel exceeds max-frag-colors, then this implementation discards or designates the fragments in excess of the fragment threshold (e.g., 3) as "invalid." This is done be discarding or designating the lowest priority fragments until only the top-priority fragments remain. This process does not eliminate fragments that cover a normal sample. If the number of fragments that cover a normal sample is greater than the fragment threshold, then the pixel is stored as a sample color set 510. As a result, a color is always stored for each of the normal samples.

Fragment priority can be determined in many ways. One example is to find the lowest coverage sample number covered by each fragment. Then the fragment with the lowest coverage sample number has the highest priority. A benefit to this method is that it is independent of the fragment colors and of the order in which opaque triangles are tessellated. This eliminates two sources of temporal artifacts, where a minor change in the scene from one frame to another could cause a visible change in how a pixel is displayed.

The multi-sample pixel 505 has associated with it a mode tracker 540, which performs exactly the same function as Mode Tracker 340 in FIG. 3. In this example, the mode tracker is two bits long and indicates whether the pixel stores a Sample Color set 510 or a Fragment Color Set 530, and in the latter case, how many fragment colors are stored in the Fragment Color Set. As depicted, the sample-fragment map 510 includes a series of sample masks with each entry in the map being assigned to a particular sample of the pixel (e.g., S0-SF).

A sample mask is used to encode the "invalid" indicators. This invalid encoding denotes samples associated with fragments that were discarded due to exceeding the fragment threshold. The maximum fragment number may be used to indicate "invalid", since the fragment threshold is always less than the number of fragment slots available in a Fragment Color Set 530. These samples are ignored when the pixel is resolved, since their correct color is not known. As a result, this method never assigns an incorrect color to a sample. Each "valid" fragment references a fragment color in the Fragment Color Set 530 and so has a correct color associated with it.

One or more implementations of this technology guarantee a minimum quality for each pixel by assuring that the normal samples are always covered. This occurs either because the fragments stored in Fragment Color Set 530 cover all of the normal samples, or else because the pixel is stored using Sample Color Set 510. The Mode Tracker 540 for each pixel specifies whether a Sample Color Set or Fragment Color Set is used, and if the latter, how many fragments are stored in the Fragment Color Set. If the number of normal samples is four, then this guarantees a minimum of 4× MSAA quality level for all pixels. Of course, other values for the number of normal samples will guarantee other levels of minimum quality (e.g., 2× or 8×).

Alternatives to the technologies described herein offer multi-pixel compression modes that use different numbers of normal and coverage samples and different pixel sizes. This allows multiple choices for the minimum and maximum quality by changing the number of fragments that can cover an individual pixel before converting to sample mode and by changing the number of colors preserved in sample mode.

For example, the method of FIG. 5 may be used with pixels that are larger or smaller than 32-bits. The size of the sample to fragment mapping must store a number of entries equal to the number of samples, where each entry is large enough to encode up to the maximum fragment number as well as an Invalid code. In some cases, the sample to fragment mapping may require more than one slot in the Fragment Color Set 530.

For another example, FIG. 6 shows examples of using 8 normal samples and 8 coverage samples. FIG. 6A shows the format for 16-bit pixels. In this case the sample to fragment mask occupies three 16-bit fragment color slots, so there can be a maximum of five fragments before switching to sample-mode. FIG. 6B shows the format for 32-bit pixels. In this case the sample to fragment mask occupies two 16-bit fragment color slots, so there can be a maximum of six fragments before switching to sample-mode.

Example Methodological Implementation of Lossy Fragment Compression

Figure 7:
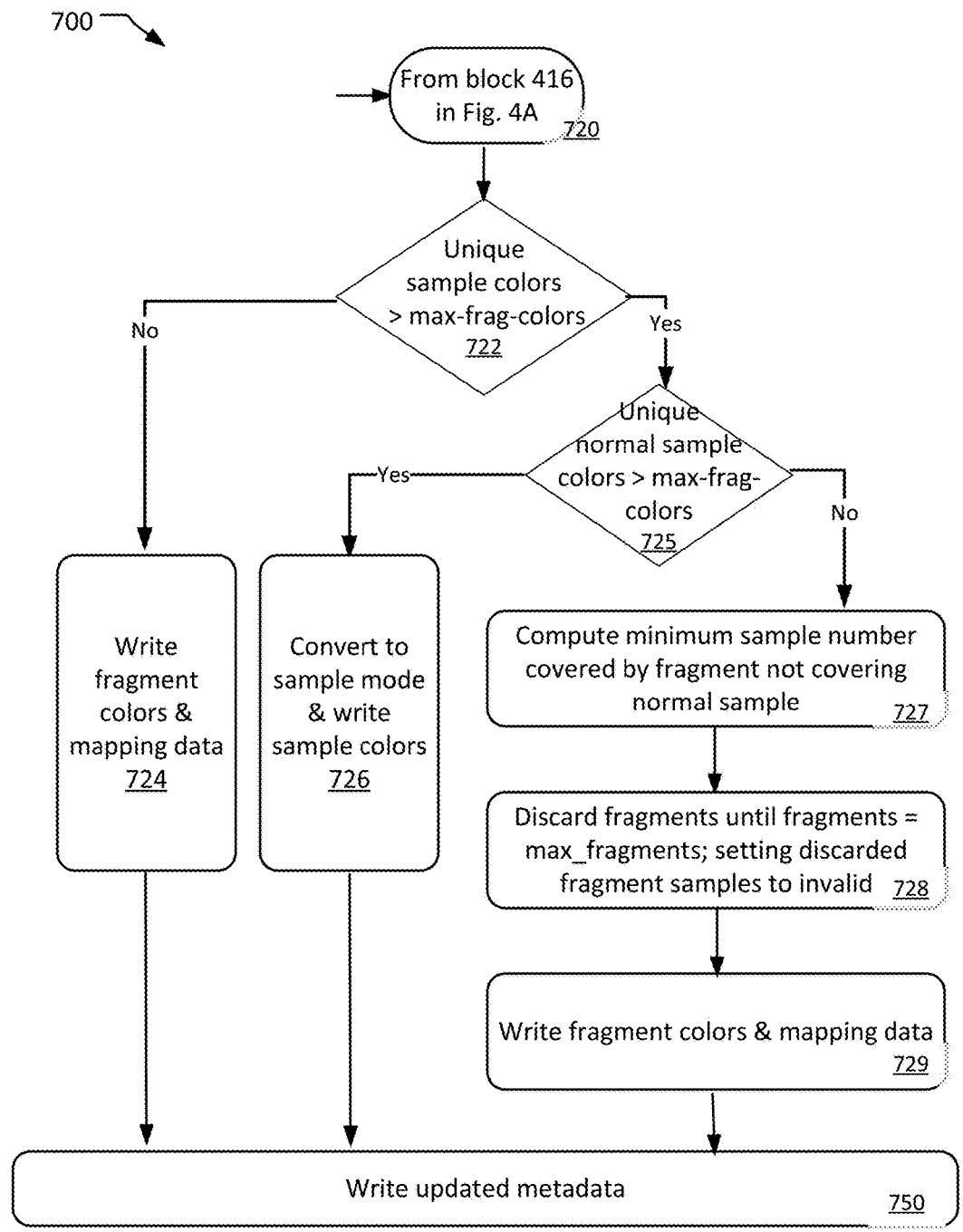
FIG. 7 illustrates an example methodological implementation in accordance with the lossy compression technology described herein.

FIG. 7 shows an example process 700 illustrating one or more implementations of the technology as described herein. The example process 700 may be implemented as part of a computer graphics (CG) system. The process 700 is implemented when the process described in FIG. 4A reaches block 416 in FIG. 4A. Instead of proceeding to block 420, it proceeds to block 720. In all other cases, lossy compression according to this technology can be implemented identically to process 400 in FIGS. 4A-C for lossless compression, using the added condition that a non-opaque operation to an invalid sample produces an invalid sample. Note that the reads and writes specified as part of this process may be consolidated using caches. Also, note that simplifications of this process may also be implemented that exclude the optimized cases.

Block 416 in FIG. 4A is reached when the current pixel is in fragment mode and the new fragment either non-opaque or else doesn't fully cover the pixel and the maximum number of fragments (max-frag-colors) are already stored in the pixel. These are the only cases where lossy fragment compression may need to discard covered sample values by setting one or more covered samples to Invalid. Therefore a new process must be executed for lossy fragment compression. An illustrative process is described in FIG. 7.

At block 722, the number of unique sample colors is determined and compared to max-frag-colors. This can be done by comparing all of the colors or by a conservative approximation, as described for block 422 in FIG. 4B. If block 722 determines that there are no more than max-frag-colors unique colors, then block 724 is executed to write the fragment colors and sample-to-fragment mapping data. Finally, block 750 is executed to write the updated Mode Tracker meta-data. This process may reduce the number of Invalid coverage samples, if an opaque new fragment overlaps an Invalid coverage sample, but it will not introduce new Invalid coverage samples.

If block 722 determines that the number of unique sample colors is greater than max-frag-colors, or may be greater in the case of a conservative estimate of the number of unique colors, then block 725 is executed to determine whether the number of unique sample colors for the normal samples is greater than max_frag-colors. If so, block 726 is executed, which converts the pixel to sample mode and writes out the normal sample values. All of the coverage samples are implicitly set to Invalid in sample mode. Then block 750 is executed to write out the Mode Tracker meta-data.

Otherwise, blocks 727, 728, and 729 are executed, followed by block 750 to write out the mode tracker meta-data. Block 727 computes the minimum of the covered sample numbers for each fragment that does not cover any normal samples. Block 728 uses that value to decide which fragments to discard. Fragments with the largest minimum covered sample number are discarded until the total number of fragments is max-frag-colors. Covered samples for the discarded fragments are set to Invalid. Finally, block 729 writes the fragment colors and mapping data. This process is guaranteed to be able to reduce the number of fragments to max-frag-colors since if the normal samples are covered by more than max-frag-colors fragments, block 724 would have been executed instead.

A system using process 700 guarantees a minimum quality for each pixel by assuring that colors are always stored for the normal samples. If the number of normal samples is four, then this guarantees a minimum of 4× MSAA quality level for all pixels. Pixels where two or more of the normal samples are covered by the same fragment are able to store fragments that cover only the coverage samples, resulting in higher quality using an effective MSAA rate of the total number of normal and coverage samples. Alternative implementations may offer multi-pixel compression modes that provide different values for the number of normal samples will guarantee other levels of minimum quality (e.g., 2× or 8×) and other numbers of coverage samples will allow other levels of maximum quality (e.g. 8× or 16×)

In one or more implementations, the set of multiple samples of a pixel includes, at least, sixteen samples and the number of normal samples is four. In one or more implementations, the set of multiple samples of a pixel includes, at least, sixteen samples and the max-frag-colors is three.

Resolving Lossy Compressed Pixels

Before multi-sample pixels can be displayed, they must be "resolved" to a single value per pixel. This is typically done for lossless multi-sampling by averaging the sample values within a pixel. This is referred to as a "box filter". The resolve step may also be done by computing a weighted sum of the samples in the pixel and in nearby pixels. The methods below are described as variants of the box filter, but may be applied to more complex filters as well. This may be done by normalizing the weights, that is, by summing the weights of the valid samples and dividing each weight by that sum so that they add to 1.0.

The resolve operation may be performed for lossy compressed pixels as described herein using several methods. The simplest is to apply a box filter over the valid samples. E.g., if there are 7 valid samples, they would be added together and the sum would be divided by 7. This requires the complexity of supporting non-power-of-two divisors during resolve. It also could result in temporal artifacts if a fragment with a strongly different color from the others is discarded in one frame but not in another.

Another alternative is to perform the resolve on only a limited number of subsets of the total set of samples. The selected subset would be the largest one that includes only valid samples. The sizes of the subsets can be chosen to be powers or two or to otherwise limit the number of divisors that must be supported. The subsets may also be chosen to scatter the selected samples around the pixel, thus limiting potential temporal aliasing by ensuring that a set of equally spaced samples get equal weights in the resolve for each frame.

Figures 8A, 8B, 8C:
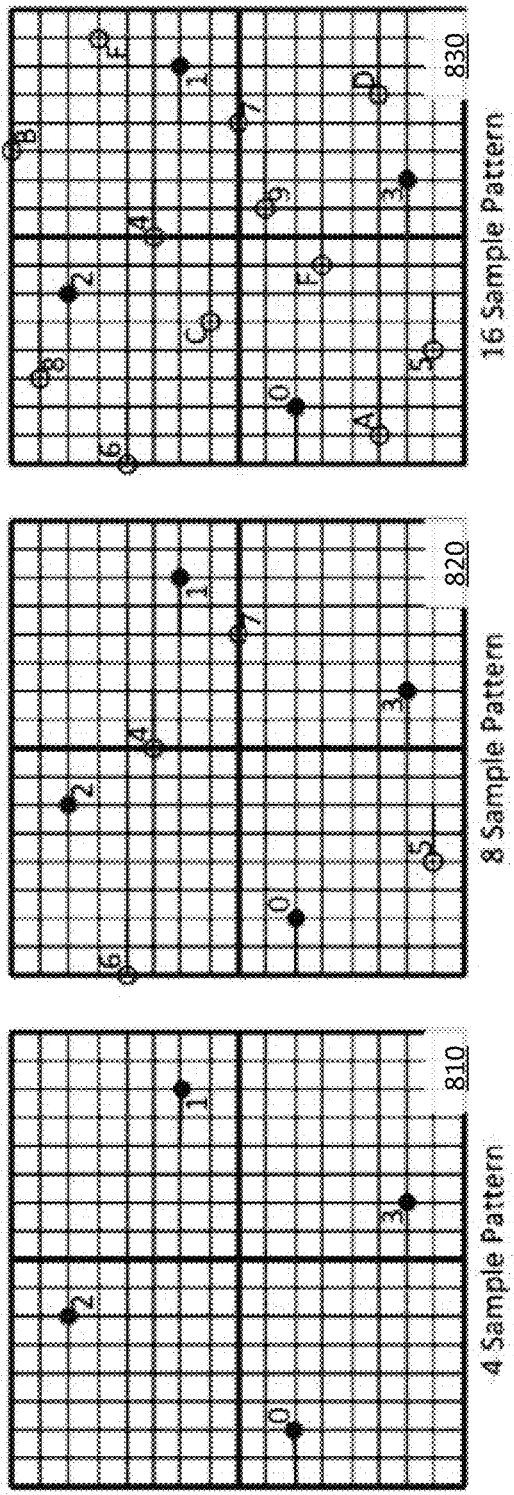
FIGS. 8A-8C show examples of ways to define 4×, 8×, and 16× sample patterns in accordance with one or more implementations of the technology described herein.

FIGS. 8A-8C show examples of a way to define 4×, 8×, and 16× sample patterns, respectively, that are chosen so that each pattern is a superset of the one before and each pattern scatters samples roughly evenly across the pixel. FIG. 8A shows a 4 sample pattern 810, which is the pattern of the samples of a 4× multi-sample pixel. The samples are labeled based upon their priority from 0-3, with the lowest value representing the highest priority. In a configuration with four normal samples, these samples would always be valid and therefore included in the resolve.

FIG. 8B shows an 8 sample pattern 820, which fills in the 4-sample patter in FIG. 8A with an additional four coverage samples to produce an 8× multi-sampling pattern. FIG. 8C shows a 16 sample pattern 830, which provides an additional 8 coverage samples to produce a 16× multi-sampling pattern. Other sample patterns may be used.

As depicted, there is a hexadecimal number beside the sample in each of the patterns (810, 820, 830). That hexadecimal number next to a sample specifies that sample's priority, with the smaller numbers having higher priority. In one implementation, these priority values are used to determine which fragment(s) to discard (e.g., mark as invalid) in fragment mode. The fragments with the lowest priority are discarded until only a defined number (e.g., three) fragments remain—provided that those remaining fragments cover the normal samples. The hexadecimal numbers are here chosen so that samples of similar priority are scattered across the pixel. The result is that the priority determination is biased toward invalidating fragments that are scattered across the pixel, rather than being biased toward invalidating adjacent fragments.

Lossy Compression Over Blocks of Pixels

The lossy compression method may be extended by storing a set of fragment colors for a blocks of pixels instead of a single pixel. This may be used to avoid creating invalid samples if one pixel in the block are covered by many fragments while other pixels in the block are covered by few fragments. Typically, a single memory access unit is significantly larger than a pixel, e.g. a memory access may be a 64B unit whereas a typical pixel size is 32-bits. In this example, 4 pixels of 4 color or fragment slots each fit within a single memory access unit.

Figures 9A, 9B, 9C:
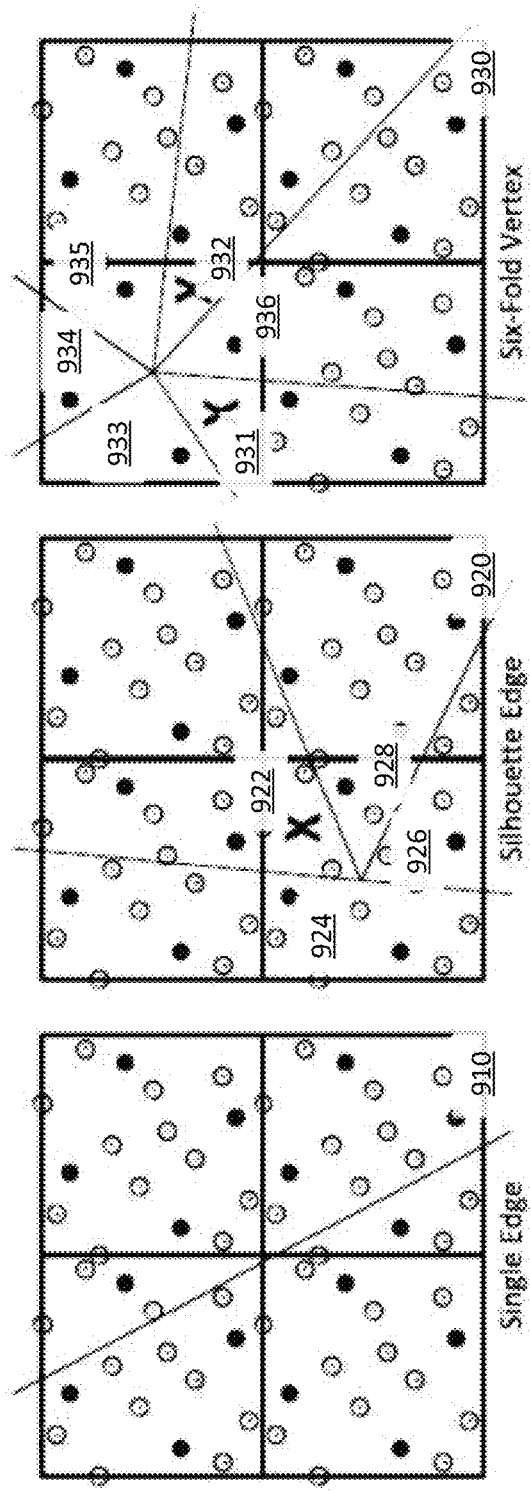
FIGS. 9A-9C show examples of typical ways that primitive (e.g., triangle) meshes may cover 2×2 pixel quads of 16× multi-sample pixels in accordance with one or more implementations of the technology described herein.

FIGS. 9A-C show examples of typical ways that primitive (e.g., triangle) meshes may cover 2×2 pixel quads of 16× multi-sample pixels. These figures provide an illustrative example of the case of 4 normal samples and 12 coverage samples. The solid dots in each pixel represent the normal samples and the open dots represent the coverage samples. Similar considerations apply to combinations of different size pixel blocks and different numbers of normal and coverage samples.

FIG. 9A illustrates a single edge passing through the pixel quad 910. This example has no invalid samples because there are at most two fragments per pixel and each pixel is able to store up to three fragment colors. As a result, the triangle edge is rendered at full 16× sample precision for maximum quality.

FIG. 9B illustrates a pixel quad 920 covered by a silhouette edge over a large background triangle. The pixel in the lower left-hand corner of the pixel quad 920 is covered by four fragments, but only three of them cover normal samples and at most 3 fragment colors can be stored in the pixel. Fragment 922 covers only coverage samples, so fragment 922 is discarded. The fragment 922 is marked an X to indicate visually for this illustration that the two samples it covers will not be associated with any fragment and will, instead, be marked invalid. Since most of the samples are valid, the silhouette edge is rendered at close to the quality of 16× multi-sampling, though excluding the invalid samples alters the ratio of the colors to the left and right of the silhouette edge in the resolve.

FIG. 9C illustrates a pixel quad 930 where a vertex of the triangle mesh falls in the pixel in the upper left-hand corner. In a typical triangle mesh, six triangles meet at each vertex, though in some cases a smaller number of triangles meet at a vertex. The result is that the pixel in the upper left and corner is covered by six fragments. Fragments 933, 934, 935 and 936 cover normal samples, so that each normal sample has a different color. As a result, the pixel is stored in sample-mode. This not only causes fragments 931 and 932 to be discarded, as illustrated by marking them with an X, but causes all of the coverage samples in the pixel to be invalid. Storing this pixel in sample-mode reduces the number of samples from 16 to 4.

If the triangles around the vertex have similar colors, then storing this pixel in sample mode. is unlikely to significantly change the resolved color. If the triangles around the vertex differ greatly in color the resolved result could be quite different. In a single frame, this color change is unlikely to be visible, since it isn't visually obvious what color should appear at that pixel. However, temporal artifacts could result as the triangle mesh moves and different fragments are discarded from one frame to the next.

These problems can be greatly reduced by pooling the fragment color storage for a 2×2 block of pixels. For this case with 4 normal samples, there are 16 slots for fragment colors and for the fragment to sample mappings. Under the multi-sampling algorithm, each pixel will typically have a separate color, even if a single triangle covers all of them. So each pixel will need at least one fragment color slot. Other fragment color slots could be shared between them.

FIG. 10 shows an example of a format 1010 that encodes a 2×2 block of multi-sample pixels with 4 normal samples and 12 coverage samples per pixel. In particular, the format 1010 reserves space for one color per pixel plus seven more fragment colors to be allocated among the four pixels, as specified by the "map" field. One of the pixels may use up to six of the pooled fragment colors, plus its reserved pixel color. The 3-bit mask specifies a color or Invalid for each of the 16 samples. The remaining three pixels may each use two of the pooled fragment colors, plus its reserved color. The three 2-bit masks specify one of the three colors or Invalid for each sample in those three pixels.

This format 1010 is an example of a technique to provide additional compression modes for blocks of pixels, especially those that can better handle cases with a vertex in the pixel block. This illustrative example is designed for use with 4 normal samples and 12 coverage samples per pixel. Similar methods of pooling fragment colors may be used with different numbers of normal samples and coverage samples and with different sizes of pixel blocks.

It is desirable to save memory bandwidth in the common cases of a single triangle covering the entire pixel block or a single triangle edge intersecting the pixel block. FIGS. 11A and 11B show examples of pixel-quad formats 1110 and 1120 that are specialized formats designed to encode data (e.g., color) under these common cases of a small number of fragments covering the pixel block.

FIG. 11A shows the example format 1110 for encoding a 2×2 pixel quad where all four pixels are fully covered by a single fragment. In that situation, just four colors are sufficient. This format encodes one color per pixel. Only one quarter of the memory footprint needs to be accessed in this case. If the memory access unit size is larger than four pixel slots, multiple blocks of pixels can be interleaved so that if all of them use this mode, only one quarter of the memory access units need to be accessed.

FIG. 11B shows the example format 1120 for encoding 2×2 pixel quad where a triangle edge passes through the pixel quad. This format encodes one color in each of 2 or 3 pixels with two extra fragment colors for the remaining pixel(s). Two of the pixels are fully covered and two use 1-bit per sample to select one of two colors. A map field specifies which pixels get which colors. In particular, with format 1120, the map field specifies how the fragment data (e.g., colors) are assigned to the pixels. Only half of the memory footprint needs to be accessed for this case.

Additional compression can be achieved by using a lossless compression method along with the lossy compression techniques described herein. Additional compression can be realized by marking that all for pixels (in a pixel quad) use a clear color.

Comparisons to Conventional Approaches

Examples of existing "coverage sample" lossy MSAA compression approaches include Nvidia's CSAA (Coverage sample anti-aliasing) and AMD's EQAA (enhanced quality anti-aliasing). As described previously, the CSAA algorithm does not have the ability to mark coverage samples as invalid. As a result, if the color cannot be stored for a coverage sample, it is assigned the color of a nearby normal sample. The result may differ depending on the order in which the triangles are rendered. The technology described herein does not have this limitation, since if the color is unknown at a sample it is marked Invalid, and the selection of which fragments to discard is independent of the triangle rendering order.

Some proposed methods for lossy fragment compression merge fragments instead of discarding them, using a color that is a blend of the two fragment colors. This technique can produce what are called "pop-through" artifacts, where a color that should have been completely occluded is visible in the pixel. For example, suppose all of the samples in a pixel are black, and then a large number of tiny white triangles are rendered, which together fully cover the pixel. If the compression algorithm blends two adjacent samples, where one is black, and the other is white, and then assigns that value to a sample that has already been covered by a white triangle, the result will be a gray sample. After the samples are resolved, the pixel color won't be perfectly white. Some of the underlying black will have popped through the covering white triangles.

Other proposed methods for lossy fragment compression select which fragments to discard based on the number of samples covered. This can also significant artifacts. Consider, for example, a scenario in which a pixel is half-covered by a single black fragment and half covered by many small white tessellated triangles. If fragments are eliminated based on the number of samples covered, only white samples will be discarded, resulting is a significant change in the resolved pixel color. With the technology described herein, the pixel would fall back to sample-mode, thus preserving the correct color for all of the normal samples.

With conventional approaches (e.g., CSAA and EQAA), blending is problematic. The conventional approaches are primarily designed for opaque geometry and only support a subset of the blend modes. Other modes either do not use coverage samples or may link them incorrectly. Blending modes are a way to use the color information in two different sources to produce a composite or combined pixel or image. The technology described herein supports all blend modes and produce the correct result for any sample that is not marked Invalid. If there are too many unique blended colors, the pixel falls back to sample-mode, which provides the correct blended color for each normal sample.

Finally, the conventional approaches (e.g., CSAA and EQAA) require a significant amount of meta-data to store the fragment to sample mapping. Unlike those approaches, the technologies described herein store that information in the pixel data format itself. Consequently, only a few (e.g., one to four) bits of meta-data per multi-sample pixel are utilized in some implementations.

System Overview

Figure 12:
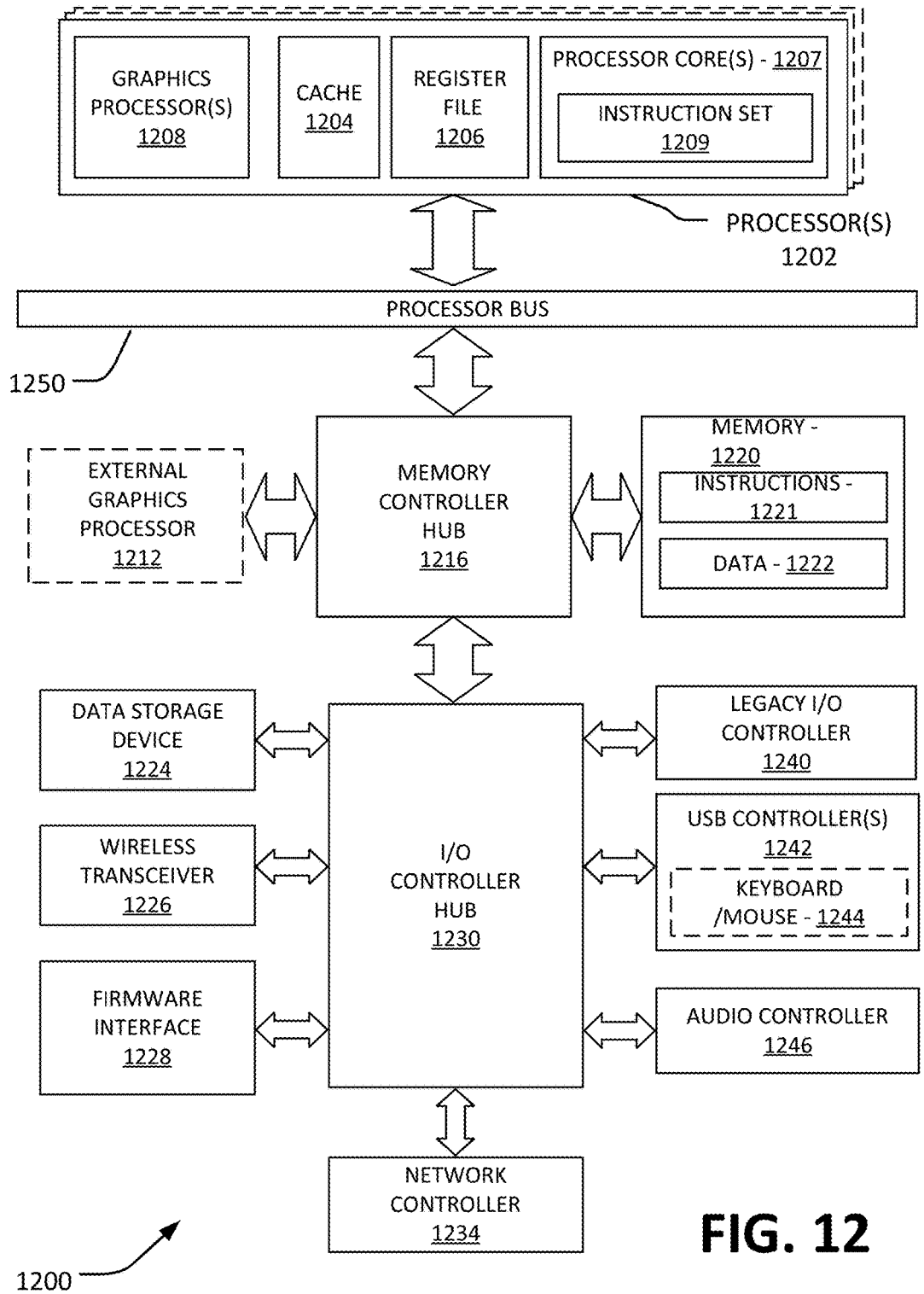
FIG. 12 is a block diagram of a data processing system according to an embodiment.

FIG. 12 is a block diagram of a processing system 1200, according to an embodiment. In various embodiments the system 1200 includes one or more processors 1202 and one or more graphics processors 1208, and may be a single processor desktop system, a multiprocessor workstation system, or a server system having a large number of processors 1202 or processor cores 1207. In one embodiment, the system 1200 is a processing platform incorporated within a system-on-a-chip (SoC) integrated circuit for use in mobile, handheld, or embedded devices.

An embodiment of system 1200 can include, or be incorporated within a server-based gaming platform, a game console, including a game and media console, a mobile gaming console, a handheld game console, or an online game console. In some embodiments system 1200 is a mobile phone, smart phone, tablet computing device or mobile Internet device. Data processing system 1200 can also include, couple with, or be integrated within a wearable device, such as a smart watch wearable device, smart eyewear device, augmented reality device, or virtual reality device. In some embodiments, data processing system 1200 is a television or set top box device having one or more processors 1202 and a graphical interface generated by one or more graphics processors 1208.

In some embodiments, the one or more processors 1202 each include one or more processor cores 1207 to process instructions which, when executed, perform operations for system and user software. In some embodiments, each of the one or more processor cores 1207 is configured to process a specific instruction set 1209. In some embodiments, instruction set 1209 may facilitate Complex Instruction Set Computing (CISC), Reduced Instruction Set Computing (RISC), or computing via a Very Long Instruction Word (VLIW). Multiple processor cores 1207 may each process a different instruction set 1209, which may include instructions to facilitate the emulation of other instruction sets. Processor core 1207 may also include other processing devices, such a Digital Signal Processor (DSP).

In some embodiments, the processor 1202 includes cache memory 1204. Depending on the architecture, the processor 1202 can have a single internal cache or multiple levels of internal cache. In some embodiments, the cache memory is shared among various components of the processor 1202. In some embodiments, the processor 1202 also uses an external cache (e.g., a Level-3 (L3) cache or Last Level Cache (LLC)) (not shown), which may be shared among processor cores 1207 using known cache coherency techniques. A register file 1206 is additionally included in processor 1202 which may include different types of registers for storing different types of data (e.g., integer registers, floating point registers, status registers, and an instruction pointer register). Some registers may be general-purpose registers, while other registers may be specific to the design of the processor 1202.

In some embodiments, processor 1202 is coupled with a processor bus 1210 to transmit communication signals such as address, data, or control signals between processor 1202 and other components in system 1200. In one embodiment the system 1200 uses an exemplary 'hub' system architecture, including a memory controller hub 1216 and an Input Output (I/O) controller hub 1230. A memory controller hub 1216 facilitates communication between a memory device and other components of system 1200, while an I/O Controller Hub (ICH) 1230 provides connections to I/O devices via a local I/O bus. In one embodiment, the logic of the memory controller hub 1216 is integrated within the processor.

Memory device 1220 can be a dynamic random access memory (DRAM) device, a static random access memory (SRAM) device, flash memory device, phase-change memory device, or some other memory device having suitable performance to serve as process memory. In one embodiment the memory device 1220 can operate as system memory for the system 1200, to store data 1222 and instructions 1221 for use when the one or more processors 1202 executes an application or process. Memory controller hub 1216 also couples with an optional external graphics processor 1212, which may communicate with the one or more graphics processors 1208 in processors 1202 to perform graphics and media operations.

In some embodiments, ICH 1230 enables peripherals to connect to memory device 1220 and processor 1202 via a high-speed I/O bus. The I/O peripherals include, but are not limited to, an audio controller 1246, a firmware interface 1228, a wireless transceiver 1226 (e.g., Wi-Fi, Bluetooth), a data storage device 1224 (e.g., hard disk drive, flash memory, etc.), and a legacy I/O controller 1240 for coupling legacy (e.g., Personal System 2 (PS/2)) devices to the system. One or more Universal Serial Bus (USB) controllers 1242 connect input devices, such as keyboard and mouse 1244 combinations. A network controller 1234 may also couple to ICH 1230. In some embodiments, a high-performance network controller (not shown) couples with processor bus 1210. It will be appreciated that the system 1200 shown is exemplary and not limiting, as other types of data processing systems that are differently configured may also be used. For example, the I/O controller hub 1230 may be integrated within the one or more processor 1202, or the memory controller hub 1216 and I/O controller hub 1230 may be integrated into a discreet external graphics processor, such as the external graphics processor 1212.

Figure 13:
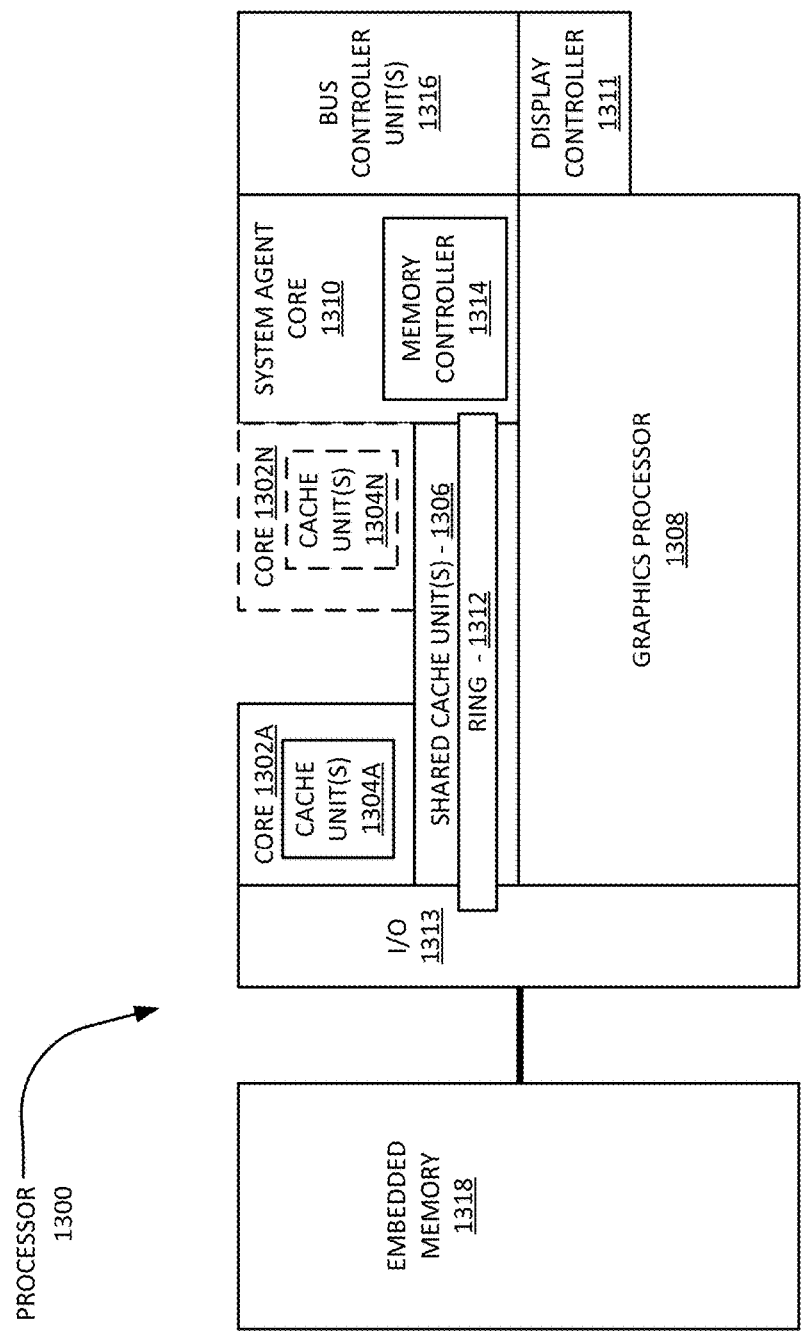
FIG. 13 is a block diagram of an embodiment of a processor having one or more processor cores, an integrated memory controller, and an integrated graphics processor.

FIG. 13 is a block diagram of an embodiment of a processor 1300 having one or more processor cores 1302A-1302N, an integrated memory controller 1314, and an integrated graphics processor 1308. Those elements of FIG. 13 having the same reference numbers (or names) as the elements of any other figure herein can operate or function in any manner similar to that described elsewhere herein, but are not limited to such. Processor 1300 can include additional cores up to and including additional core 1302N represented by the dashed lined boxes. Each of processor cores 1302A-1302N includes one or more internal cache units 1304A-1304N. In some embodiments each processor core also has access to one or more shared cached units 1306.

The internal cache units 1304A-1304N and shared cache units 1306 represent a cache memory hierarchy within the processor 1300. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1306 and 1304A-1304N.

In some embodiments, processor 1300 may also include a set of one or more bus controller units 1316 and a system agent core 1310. The one or more bus controller units 1316 manage a set of peripheral buses, such as one or more Peripheral Component Interconnect buses (e.g., PCI, PCI Express). System agent core 1310 provides management functionality for the various processor components. In some embodiments, system agent core 1310 includes one or more integrated memory controllers 1314 to manage access to various external memory devices (not shown).

In some embodiments, one or more of the processor cores 1302A-1302N include support for simultaneous multi-threading. In such embodiment, the system agent core 1310 includes components for coordinating and operating cores 1302A-1302N during multi-threaded processing. System agent core 1310 may additionally include a power control unit (PCU), which includes logic and components to regulate the power state of processor cores 1302A-1302N and graphics processor 1308.

In some embodiments, processor 1300 additionally includes graphics processor 1308 to execute graphics processing operations. In some embodiments, the graphics processor 1308 couples with the set of shared cache units 1306, and the system agent core 1310, including the one or more integrated memory controllers 1314. In some embodiments, a display controller 1311 is coupled with the graphics processor 1308 to drive graphics processor output to one or more coupled displays. In some embodiments, display controller 1311 may be a separate module coupled with the graphics processor via at least one interconnect, or may be integrated within the graphics processor 1308 or system agent core 1310.

In some embodiments, a ring based interconnect unit 1312 is used to couple the internal components of the processor 1300. However, an alternative interconnect unit may be used, such as a point-to-point interconnect, a switched interconnect, or other techniques, including techniques well known in the art. In some embodiments, graphics processor 1308 couples with the ring interconnect 1312 via an I/O link 1313.

The exemplary I/O link 1313 represents at least one of multiple varieties of I/O interconnects, including an on package I/O interconnect which facilitates communication between various processor components and a high-performance embedded memory module 1318, such as an eDRAM module. In some embodiments, each of the processor cores 1302A-1302N and graphics processor 1308 use embedded memory modules 1318 as a shared Last Level Cache.

In some embodiments, processor cores 1302A-1302N are homogenous cores executing the same instruction set architecture. In another embodiment, processor cores 1302A-1302N are heterogeneous in terms of instruction set architecture (ISA), where one or more of processor cores 1302A-N execute a first instruction set, while at least one of the other cores executes a subset of the first instruction set or a different instruction set. In one embodiment processor cores 1302A-1302N are heterogeneous in terms of microarchitecture, where one or more cores having a relatively higher power consumption couple with one or more power cores having a lower power consumption. Additionally, processor 1300 can be implemented on one or more chips or as an SoC integrated circuit having the illustrated components, in addition to other components.

Figure 14:
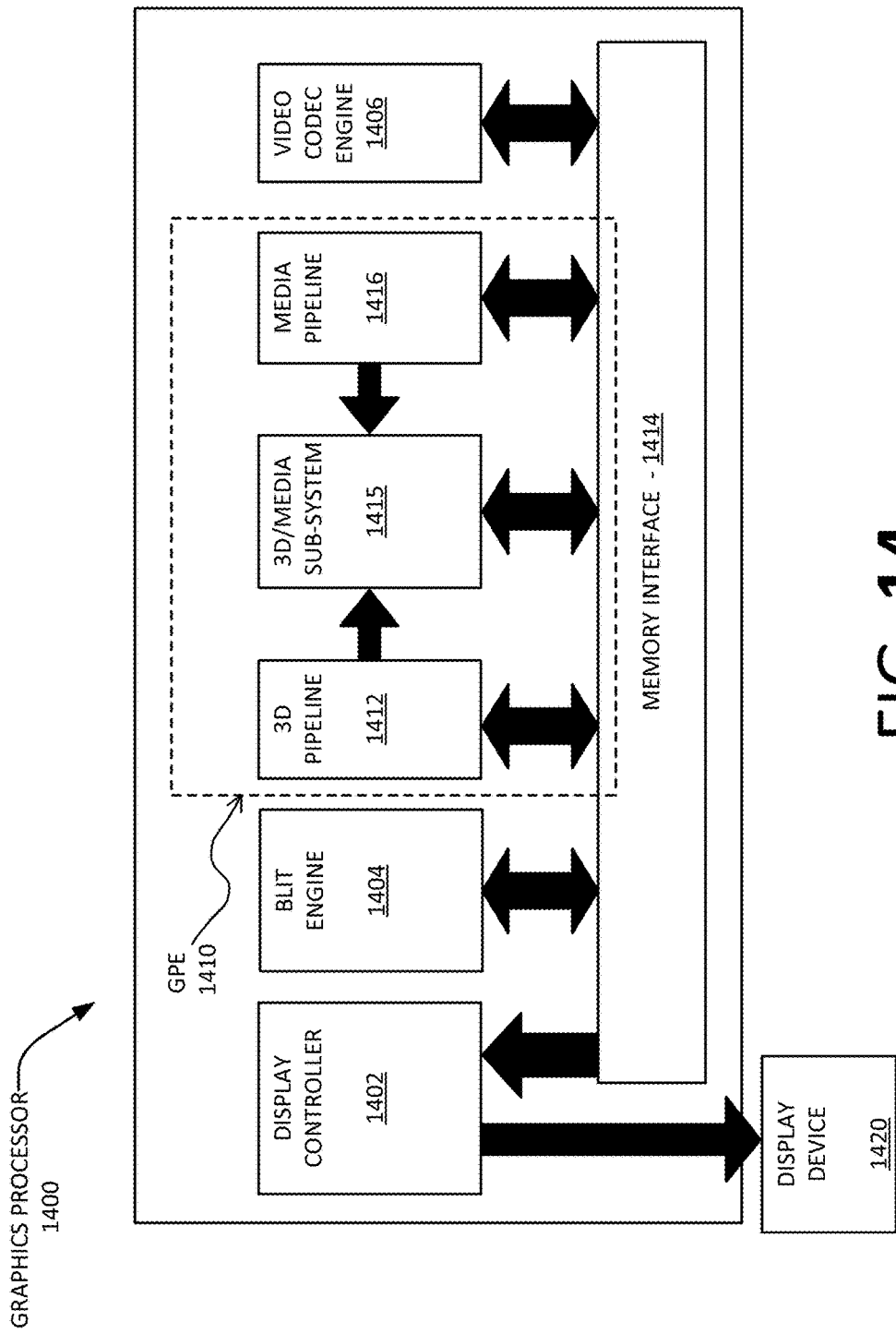
FIG. 14 is a block diagram of one embodiment of a graphics processor which may be a discrete graphics processing unit, or may be graphics processor integrated with a plurality of processing cores.

FIG. 14 is a block diagram of a graphics processor 1400, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1400 includes a memory interface 1414 to access memory. Memory interface 1414 can be an interface to local memory, one or more internal caches, one or more shared external caches, and/or to system memory.

In some embodiments, graphics processor 1400 also includes a display controller 1402 to drive display output data to a display device 1420. Display controller 1402 includes hardware for one or more overlay planes for the display and composition of multiple layers of video or user interface elements. In some embodiments, graphics processor 1400 includes a video codec engine 1406 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1400 includes a block image transfer (BLIT) engine 1404 to perform two-dimensional (2D) rasterizer operations including, for example, bit-boundary block transfers. However, in one embodiment, 2D graphics operations are performed using one or more components of graphics processing engine (GPE) 1410. In some embodiments, GPE 1410 is a compute engine for performing graphics operations, including three-dimensional (3D) graphics operations and media operations.

In some embodiments, GPE 1410 includes a 3D pipeline 1412 for performing 3D operations, such as rendering three-dimensional images and scenes using processing functions that act upon 3D primitive shapes (e.g., rectangle, triangle, etc.). The 3D pipeline 1412 includes programmable and fixed function elements that perform various tasks within the element and/or spawn execution threads to a 3D/Media sub-system 1415. While 3D pipeline 1412 can be used to perform media operations, an embodiment of GPE 1410 also includes a media pipeline 1416 that is specifically used to perform media operations, such as video post-processing and image enhancement.

In some embodiments, media pipeline 1416 includes fixed function or programmable logic units to perform one or more specialized media operations, such as video decode acceleration, video de-interlacing, and video encode acceleration in place of, or on behalf of video codec engine 1406. In some embodiments, media pipeline 1416 additionally includes a thread spawning unit to spawn threads for execution on 3D/Media sub-system 1415. The spawned threads perform computations for the media operations on one or more graphics execution units included in 3D/Media sub-system 1415.

In some embodiments, 3D/Media subsystem 1415 includes logic for executing threads spawned by 3D pipeline 1412 and media pipeline 1416. In one embodiment, the pipelines send thread execution requests to 3D/Media subsystem 1415, which includes thread dispatch logic for arbitrating and dispatching the various requests to available thread execution resources. The execution resources include an array of graphics execution units to process the 3D and media threads. In some embodiments, 3D/Media subsystem 1415 includes one or more internal caches for thread instructions and data. In some embodiments, the subsystem also includes shared memory, including registers and addressable memory, to share data between threads and to store output data.

Graphics Processing Engine

Figure 15:
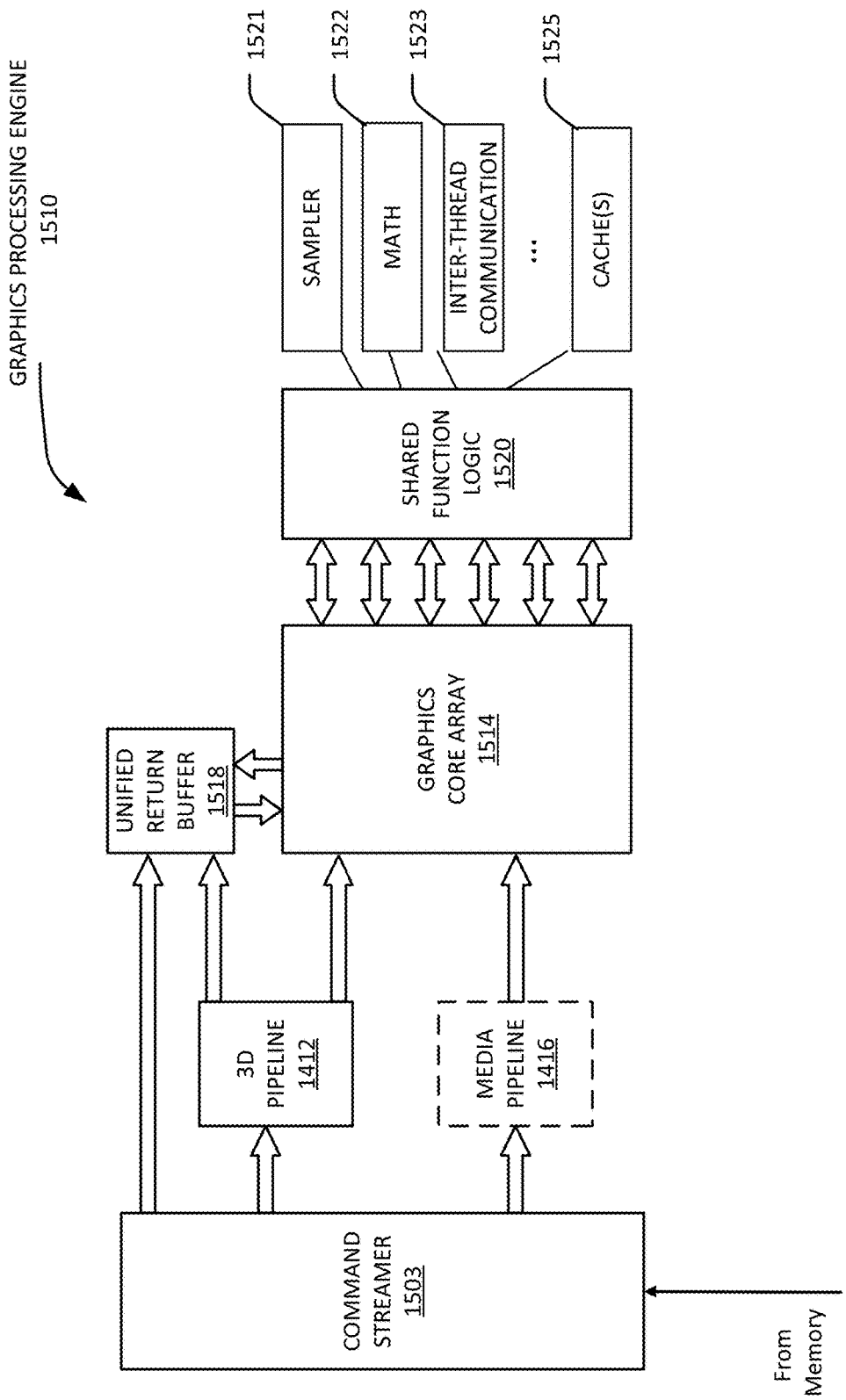
FIG. 15 is a block diagram of an embodiment of a graphics processing engine for a graphics processor.

FIG. 15 is a block diagram of a graphics processing engine 1510 of a graphics processor in accordance with some embodiments. In one embodiment, the graphics processing engine (GPE) 1510 is a version of the GPE 1410 shown in FIG. 14. Elements of FIG. 15 having the same reference numbers (or names) as the elements of any other figure herein can operate or function in any manner similar to that described elsewhere herein, but are not limited to such. For example, the 3D pipeline 1412 and media pipeline 1416 of FIG. 14 are illustrated. The media pipeline 1416 is optional in some embodiments of the GPE 1510 and may not be explicitly included within the GPE 1510. For example and in at least one embodiment, a separate media and/or image processor is coupled to the GPE 1510.

In some embodiments, GPE 1510 couples with or includes a command streamer 1503, which provides a command stream to the 3D pipeline 1412 and/or media pipelines 1416. In some embodiments, command streamer 1503 is coupled with memory, which can be system memory, or one or more of internal cache memory and shared cache memory. In some embodiments, command streamer 1503 receives commands from the memory and sends the commands to 3D pipeline 1412 and/or media pipeline 1416. The commands are directives fetched from a ring buffer, which stores commands for the 3D pipeline 1412 and media pipeline 1416. In one embodiment, the ring buffer can additionally include batch command buffers storing batches of multiple commands. The commands for the 3D pipeline 1412 can also include references to data stored in memory, such as but not limited to vertex and geometry data for the 3D pipeline 1412 and/or image data and memory objects for the media pipeline 1416. The 3D pipeline 1412 and media pipeline 1416 process the commands and data by performing operations via logic within the respective pipelines or by dispatching one or more execution threads to a graphics core array 1514.

In various embodiments the 3D pipeline 1412 can execute one or more shader programs, such as vertex shaders, geometry shaders, pixel shaders, fragment shaders, compute shaders, or other shader programs, by processing the instructions and dispatching execution threads to the graphics core array 1514. The graphics core array 1514 provides a unified block of execution resources. Multi-purpose execution logic (e.g., execution units) within the graphic core array 1514 includes support for various 3D API shader languages and can execute multiple simultaneous execution threads associated with multiple shaders.

In some embodiments the graphics core array 1514 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 1207 of FIG. 12 or core 1302A-1302N as in FIG. 13.

Output data generated by threads executing on the graphics core array 1514 can output data to memory in a unified return buffer (URB) 1518. The URB 1518 can store data for multiple threads. In some embodiments the URB 1518 may be used to send data between different threads executing on the graphics core array 1514. In some embodiments the URB 1518 may additionally be used for synchronization between threads on the graphics core array and fixed function logic within the shared function logic 1520.

In some embodiments, graphics core array 1514 is scalable, such that the array includes a variable number of graphics cores, each having a variable number of execution units based on the target power and performance level of GPE 1510. In one embodiment the execution resources are dynamically scalable, such that execution resources may be enabled or disabled as needed.

The graphics core array 1514 couples with shared function logic 1520 that includes multiple resources that are shared between the graphics cores in the graphics core array. The shared functions within the shared function logic 1520 are hardware logic units that provide specialized supplemental functionality to the graphics core array 1514. In various embodiments, shared function logic 1520 includes but is not limited to sampler 1521, math 1522, and inter-thread communication (ITC) 1523 logic. Additionally, some embodiments implement one or more cache(s) 1525 within the shared function logic 1520. A shared function is implemented where the demand for a given specialized function is insufficient for inclusion within the graphics core array 1514. Instead a single instantiation of that specialized function is implemented as a stand-alone entity in the shared function logic 1520 and shared among the execution resources within the graphics core array 1514. The precise set of functions that are shared between the graphics core array 1514 and included within the graphics core array 1514 varies between embodiments.

Figure 16:
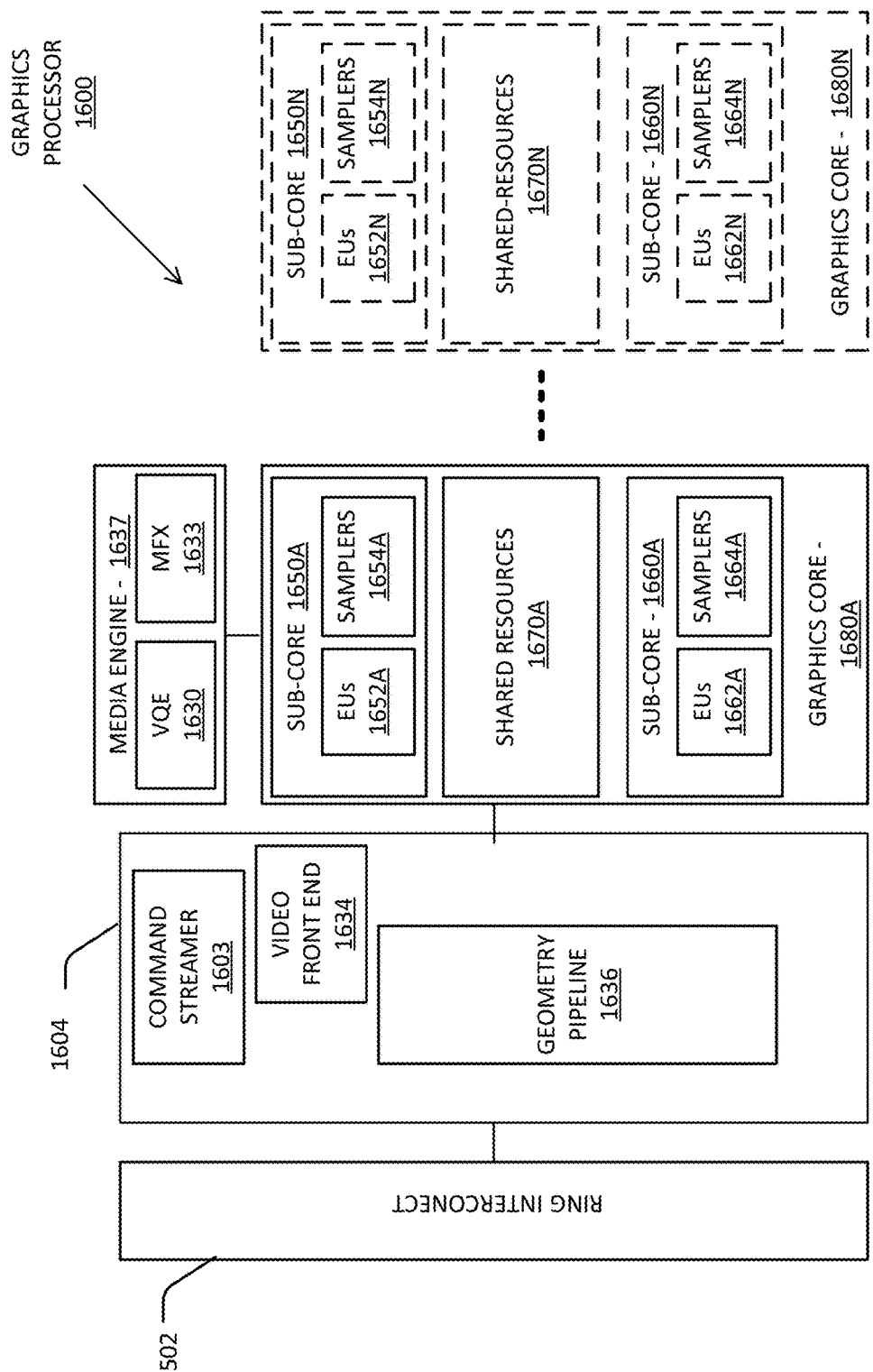
FIG. 16 is a block diagram of another embodiment of a graphics processor.

FIG. 16 is a block diagram of another embodiment of a graphics processor 1600. Elements of FIG. 16 having the same reference numbers (or names) as the elements of any other figure herein can operate or function in any manner similar to that described elsewhere herein, but are not limited to such.

In some embodiments, graphics processor 1600 includes a ring interconnect 1602, a pipeline front-end 1604, a media engine 1637, and graphics cores 1680A-1680N. In some embodiments, ring interconnect 1602 couples the graphics processor to other processing units, including other graphics processors or one or more general-purpose processor cores. In some embodiments, the graphics processor is one of many processors integrated within a multi-core processing system.

In some embodiments, graphics processor 1600 receives batches of commands via ring interconnect 1602. The incoming commands are interpreted by a command streamer 1603 in the pipeline front-end 1604. In some embodiments, graphics processor 1600 includes scalable execution logic to perform 3D geometry processing and media processing via the graphics core(s) 1680A-1680N. For 3D geometry processing commands, command streamer 1603 supplies commands to geometry pipeline 1636. For at least some media processing commands, command streamer 1603 supplies the commands to a video front end 1634, which couples with a media engine 1637. In some embodiments, media engine 1637 includes a Video Quality Engine (VQE) 1630 for video and image post-processing and a multi-format encode/decode (MFX) 1633 engine to provide hardware-accelerated media data encode and decode. In some embodiments, geometry pipeline 1636 and media engine 1637 each generate execution threads for the thread execution resources provided by at least one graphics core 1680A.

In some embodiments, graphics processor 1600 includes scalable thread execution resources featuring modular cores 1680A-1680N (sometimes referred to as core slices), each having multiple sub-cores 1650A-1650N, 1660A-1660N (sometimes referred to as core sub-slices). In some embodiments, graphics processor 1600 can have any number of graphics cores 1680A through 1680N. In some embodiments, graphics processor 1600 includes a graphics core 1680A having at least a first sub-core 1650A and a second sub-core 1660A. In other embodiments, the graphics processor is a low power processor with a single sub-core (e.g., 1650A). In some embodiments, graphics processor 1600 includes multiple graphics cores 1680A-1680N, each including a set of first sub-cores 1650A-1650N and a set of second sub-cores 1660A-1660N. Each sub-core in the set of first sub-cores 1650A-1650N includes at least a first set of execution units 1652A-1652N and media/texture samplers 1654A-1654N. Each sub-core in the set of second sub-cores 1660A-1660N includes at least a second set of execution units 1662A-1662N and samplers 1664A-1664N. In some embodiments, each sub-core 1650A-1650N, 1660A-1660N shares a set of shared resources 1670A-1670N. In some embodiments, the shared resources include shared cache memory and pixel operation logic. Other shared resources may also be included in the various embodiments of the graphics processor.

Execution Units

Figure 17:
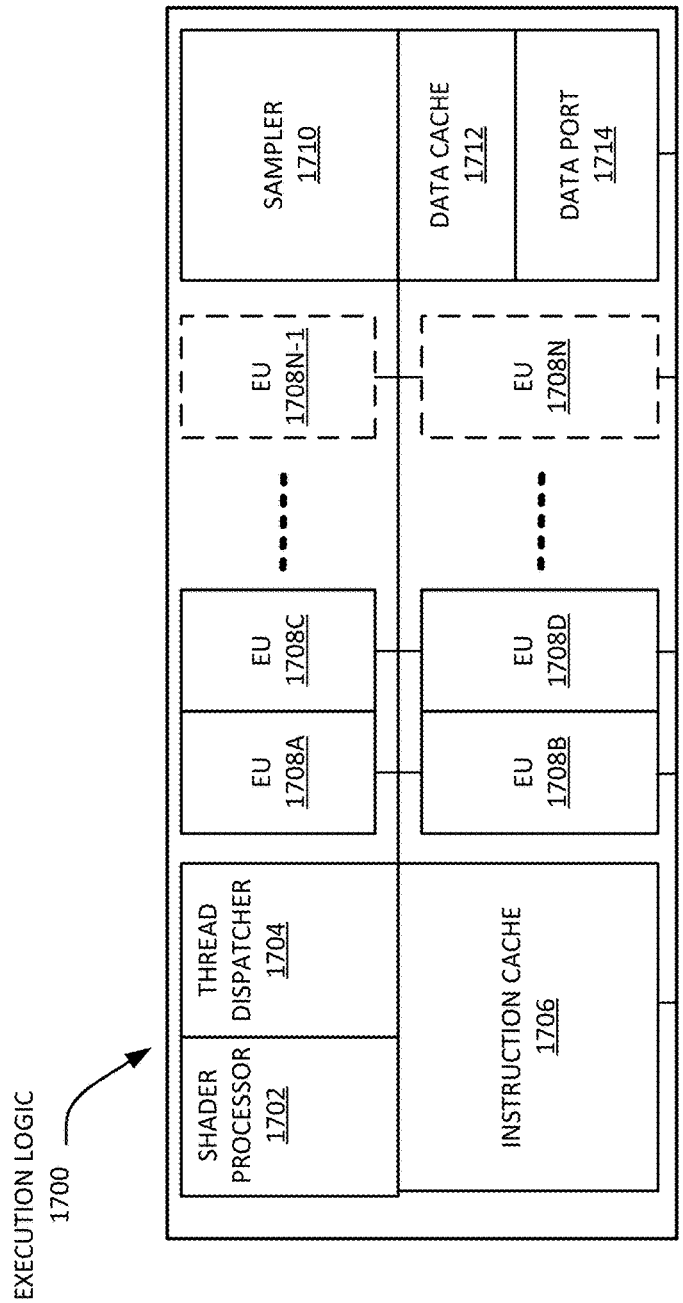
FIG. 17 illustrates thread execution logic including an array of processing elements employed in one embodiment of a graphics processing engine.

FIG. 17 illustrates thread execution logic 1700 including an array of processing elements employed in some embodiments of a GPE. Elements of FIG. 17 having the same reference numbers (or names) as the elements of any other figure herein can operate or function in any manner similar to that described elsewhere herein, but are not limited to such.

In some embodiments, thread execution logic 1700 includes a shader processor 1702, a thread dispatcher 1704, instruction cache 1706, a scalable execution unit array including a plurality of execution units 1708A-1708N, a sampler 1710, a data cache 1712, and a data port 1714. In one embodiment the scalable execution unit array can dynamically scale by enabling or disabling one or more execution units (e.g., any of execution unit 1708A, 1708B, 1708C, 1708D, through 1708N-1 and 1708N) based on the computational requirements of a workload. In one embodiment the included components are interconnected via an interconnect fabric that links to each of the components. In some embodiments, thread execution logic 1700 includes one or more connections to memory, such as system memory or cache memory, through one or more of instruction cache 1706, data port 1714, sampler 1710, and execution units 1708A-1708N. In some embodiments, each execution unit (e.g. 1708A) is a stand-alone programmable general purpose computational unit that is capable of executing multiple simultaneous hardware threads while processing multiple data elements in parallel for each thread. In various embodiments, the array of execution units 1708A-1708N is scalable to include any number individual execution units.

In some embodiments, the execution units 1708A-608N are primarily used to execute shader programs. A shader processor 1702 can process the various shader programs and dispatch execution threads associated with the shader programs via a thread dispatcher 1704. In one embodiment the thread dispatcher includes logic to arbitrate thread initiation requests from the graphics and media pipelines and instantiate the requested threads on one or more execution unit in the execution units 1708A-1708N. For example, the geometry pipeline (e.g., 1636 of FIG. 16) can dispatch vertex, tessellation, or geometry shaders to the thread execution logic 1700 (FIG. 17) for processing. In some embodiments, thread dispatcher 1704 can also process runtime thread spawning requests from the executing shader programs.

In some embodiments, the execution units 1708A-1708N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 1708A-1708N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 1708A-1708N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 1708A-1708N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 1708A-1708N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 1706) are included in the thread execution logic 1700 to cache thread instructions for the execution units. In some embodiments, one or more data caches (e.g., 1712) are included to cache thread data during thread execution. In some embodiments, a sampler 1710 is included to provide texture sampling for 3D operations and media sampling for media operations. In some embodiments, sampler 1710 includes specialized texture or media sampling functionality to process texture or media data during the sampling process before providing the sampled data to an execution unit.

During execution, the graphics and media pipelines send thread initiation requests to thread execution logic 1700 via thread spawning and dispatch logic. Once a group of geometric objects has been processed and rasterized into pixel data, pixel processor logic (e.g., pixel shader logic, fragment shader logic, etc.) within the shader processor 1702 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 1702 then executes an application programming interface (API)-supplied pixel or fragment shader program. To execute the shader program, the shader processor 1702 dispatches threads to an execution unit (e.g., 1708A) via thread dispatcher 1704. In some embodiments, pixel shader 1702 uses texture sampling logic in the sampler 1710 to access texture data in texture maps stored in memory. Arithmetic operations on the texture data and the input geometry data compute pixel color data for each geometric fragment, or discards one or more pixels from further processing.

In some embodiments, the data port 1714 provides a memory access mechanism for the thread execution logic 1700 output processed data to memory for processing on a graphics processor output pipeline. In some embodiments, the data port 1714 includes or couples with one or more cache memories (e.g., data cache 1712) to cache data for memory access via the data port.

FIG. 18 is a block diagram illustrating a graphics processor instruction formats 1800 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1800 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 1810. A 64-bit compacted instruction format 1830 is available for some instructions based on the selected instruction, instruction options, and number of operands. The native 128-bit instruction format 1810 provides access to all instruction options, while some options and operations are restricted in the 64-bit format 1830. The native instructions available in the 64-bit format 1830 vary by embodiment. In some embodiments, the instruction is compacted in part using a set of index values in an index field 1813. The execution unit hardware references a set of compaction tables based on the index values and uses the compaction table outputs to reconstruct a native instruction in the 128-bit instruction format 1810.

For each format, instruction opcode 1812 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1814 enables control over certain execution options, such as channels selection (e.g., predication) and data channel order (e.g., swizzle). For instructions in the 128-bit instruction format 1810 an exec-size field 1816 limits the number of data channels that will be executed in parallel. In some embodiments, exec-size field 1816 is not available for use in the 64-bit compact instruction format 1830.

Some execution unit instructions have up to three operands including two source operands, src0 1820, src1 1822, and one destination 1818. In some embodiments, the execution units support dual destination instructions, where one of the destinations is implied. Data manipulation instructions can have a third source operand (e.g., SRC2 1824), where the instruction opcode 1812 determines the number of source operands. An instruction's last source operand can be an immediate (e.g., hard-coded) value passed with the instruction.

In some embodiments, the 128-bit instruction format 1810 includes an access/address mode field 1826 specifying, for example, whether direct register addressing mode or indirect register addressing mode is used. When direct register addressing mode is used, the register address of one or more operands is directly provided by bits in the instruction.

In some embodiments, the 128-bit instruction format 1810 includes an access/address mode field 1826, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 1826 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 1812 bit-fields to simplify Opcode decode 1840. For an 8-bit opcode, bits 4, 5, and 6 allow the execution unit to determine the type of opcode. The precise opcode grouping shown is merely an example. In some embodiments, a move and logic opcode group 1842 includes data movement and logic instructions (e.g., move (mov), compare (cmp)). In some embodiments, move and logic group 1842 shares the five most significant bits (MSB), where move (mov) instructions are in the form of 0000xxxxb and logic instructions are in the form of 0001xxxxb. A flow control instruction group 1844 (e.g., call, jump (jmp)) includes instructions in the form of 0010xxxxb (e.g., 0x20). A miscellaneous instruction group 1846 includes a mix of instructions, including synchronization instructions (e.g., wait, send) in the form of 0011xxxxb (e.g., 0x30). A parallel math instruction group 1848 includes component-wise arithmetic instructions (e.g., add, multiply (mul)) in the form of 0100xxxxb (e.g., 0x40). The parallel math group 1848 performs the arithmetic operations in parallel across data channels. The vector math group 1850 includes arithmetic instructions (e.g., dp4) in the form of 0101xxxxb (e.g., 0x50). The vector math group performs arithmetic such as dot product calculations on vector operands.

Graphics Pipeline

Figure 19:
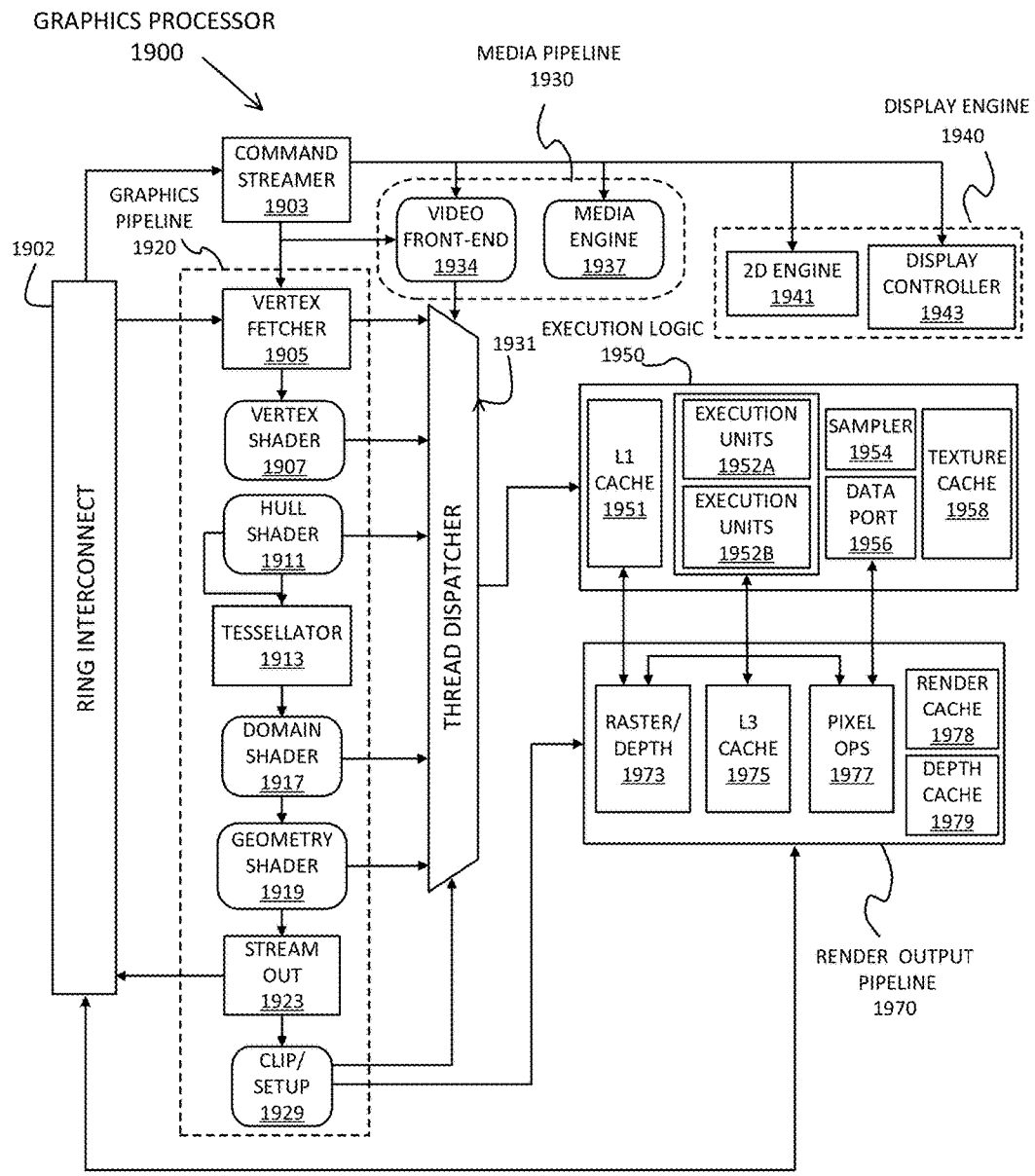
FIG. 19 is a block diagram of another embodiment of a graphics processor which includes a graphics pipeline, a media pipeline, a display engine, thread execution logic, and a render output pipeline.

FIG. 19 is a block diagram of another embodiment of a graphics processor 1900. Elements of FIG. 19 having the same reference numbers (or names) as the elements of any other figure herein can operate or function in any manner similar to that described elsewhere herein, but are not limited to such.

In some embodiments, graphics processor 1900 includes a graphics pipeline 1920, a media pipeline 1930, a display engine 1940, thread execution logic 1950, and a render output pipeline 1970. In some embodiments, graphics processor 1900 is a graphics processor within a multi-core processing system that includes one or more general purpose processing cores. The graphics processor is controlled by register writes to one or more control registers (not shown) or via commands issued to graphics processor 1900 via a ring interconnect 1902. In some embodiments, ring interconnect 1902 couples graphics processor 1900 to other processing components, such as other graphics processors or general-purpose processors. Commands from ring interconnect 1902 are interpreted by a command streamer 1903, which supplies instructions to individual components of graphics pipeline 1920 or media pipeline 1930.

In some embodiments, command streamer 1903 directs the operation of a vertex fetcher 1905 that reads vertex data from memory and executes vertex-processing commands provided by command streamer 1903. In some embodiments, vertex fetcher 1905 provides vertex data to a vertex shader 1907, which performs coordinate space transformation and lighting operations to each vertex. In some embodiments, vertex fetcher 1905 and vertex shader 1907 execute vertex-processing instructions by dispatching execution threads to execution units 1952A-1952B via a thread dispatcher 1931.

In some embodiments, execution units 1952A-1952B are an array of vector processors having an instruction set for performing graphics and media operations. In some embodiments, execution units 1952A, 1952B have an attached L1 cache 1951 that is specific for each array or shared between the arrays. The cache can be configured as a data cache, an instruction cache, or a single cache that is partitioned to contain data and instructions in different partitions.

In some embodiments, graphics pipeline 1920 includes tessellation components to perform hardware-accelerated tessellation of 3D objects. In some embodiments, a programmable hull shader 1911 configures the tessellation operations. A programmable domain shader 1917 provides back-end evaluation of tessellation output. A tessellator 1913 operates at the direction of hull shader 1911 and contains special purpose logic to generate a set of detailed geometric objects based on a coarse geometric model that is provided as input to graphics pipeline 1920. In some embodiments, if tessellation is not used, tessellation components (e.g., hull shader 1911, tessellator 1913, and domain shader 1917) can be bypassed.

In some embodiments, complete geometric objects can be processed by a geometry shader 1919 via one or more threads dispatched to execution units 1952A, 1952B, or can proceed directly to the clipper 1929. In some embodiments, the geometry shader operates on entire geometric objects, rather than vertices or patches of vertices as in previous stages of the graphics pipeline. If the tessellation is disabled the geometry shader 1919 receives input from the vertex shader 1907. In some embodiments, geometry shader 1919 is programmable by a geometry shader program to perform geometry tessellation if the tessellation units are disabled.

Before rasterization, a clipper 1929 processes vertex data. The clipper 1929 may be a fixed function clipper or a programmable clipper having clipping and geometry shader functions. In some embodiments, a rasterizer and depth test component 1973 in the render output pipeline 1970 dispatches pixel shaders to convert the geometric objects into their per pixel representations. In some embodiments, pixel shader logic is included in thread execution logic 1950. In some embodiments, an application can bypass the rasterizer and depth test component 1973 and access un-rasterized vertex data via a stream out unit 1923.

The graphics processor 1900 has an interconnect bus, interconnect fabric, or some other interconnect mechanism that allows data and message passing amongst the major components of the processor. In some embodiments, execution units 1952A, 1952B and associated cache(s) 1951, texture and media sampler 1954, and texture/sampler cache 1958 interconnect via a data port 1956 to perform memory access and communicate with render output pipeline components of the processor. In some embodiments, sampler 1954, caches 1951, 1958 and execution units 1952A, 1952B each have separate memory access paths.

In some embodiments, render output pipeline 1970 contains a rasterizer and depth test component 1973 that converts vertex-based objects into an associated pixel-based representation. In some embodiments, the rasterizer logic includes a windower/masker unit to perform fixed function triangle and line rasterization. An associated render cache 1978 and depth cache 1979 are also available in some embodiments. A pixel operations component 1977 performs pixel-based operations on the data, though in some instances, pixel operations associated with 2D operations (e.g. bit block image transfers with blending) are performed by the 2D engine 1941, or substituted at display time by the display controller 1943 using overlay display planes. In some embodiments, a shared L3 cache 1975 is available to all graphics components, allowing the sharing of data without the use of main system memory.

In some embodiments, graphics processor media pipeline 1930 includes a media engine 1937 and a video front end 1934. In some embodiments, video front end 1934 receives pipeline commands from the command streamer 1903. In some embodiments, media pipeline 1930 includes a separate command streamer. In some embodiments, video front-end 1934 processes media commands before sending the command to the media engine 1937. In some embodiments, media engine 1937 includes thread spawning functionality to spawn threads for dispatch to thread execution logic 1950 via thread dispatcher 1931.

In some embodiments, graphics processor 1900 includes a display engine 1940. In some embodiments, display engine 1940 is external to processor 1900 and couples with the graphics processor via the ring interconnect 1902, or some other interconnect bus or fabric. In some embodiments, display engine 1940 includes a 2D engine 1941 and a display controller 1943. In some embodiments, display engine 1940 contains special purpose logic capable of operating independently of the 3D pipeline. In some embodiments, display controller 1943 couples with a display device (not shown), which may be a system integrated display device, as in a laptop computer, or an external display device attached via a display device connector.

In some embodiments, graphics pipeline 1920 and media pipeline 1930 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 20A is a block diagram illustrating a graphics processor command format 2000 according to some embodiments. FIG. 20B is a block diagram illustrating a graphics processor command sequence 2010 according to an embodiment. The solid lined boxes in FIG. 20A illustrate the components that are generally included in a graphics command while the dashed lines include components that are optional or that are only included in a sub-set of the graphics commands. The exemplary graphics processor command format 2000 of FIG. 20A includes data fields to identify a target client 2002 of the command, a command operation code (opcode) 2004, and the relevant data 2006 for the command. A sub-opcode 2005 and a command size 2008 are also included in some commands.

In some embodiments, client 2002 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2004 and, if present, sub-opcode 2005 to determine the operation to perform. The client unit performs the command using information in data field 2006. For some commands an explicit command size 2008 is expected to specify the size of the command. In some embodiments, the command parser automatically determines the size of at least some of the commands based on the command opcode. In some embodiments commands are aligned via multiples of a double word.

The flow diagram in FIG. 20B shows an exemplary graphics processor command sequence 2010. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 2010 may begin with a pipeline flush command 2012 to cause any active graphics pipeline to complete the currently pending commands for the pipeline. In some embodiments, the 3D pipeline 2022 and the media pipeline 2024 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 2012 can be used for pipeline synchronization or before placing the graphics processor into a low power state.

In some embodiments, a pipeline select command 2013 is used when a command sequence requires the graphics processor to explicitly switch between pipelines. In some embodiments, a pipeline select command 2013 is required only once within an execution context before issuing pipeline commands unless the context is to issue commands for both pipelines. In some embodiments, a pipeline flush command is 2012 is required immediately before a pipeline switch via the pipeline select command 2013.

In some embodiments, a pipeline control command 2014 configures a graphics pipeline for operation and is used to program the 3D pipeline 2022 and the media pipeline 2024. In some embodiments, pipeline control command 2014 configures the pipeline state for the active pipeline. In one embodiment, the pipeline control command 2014 is used for pipeline synchronization and to clear data from one or more cache memories within the active pipeline before processing a batch of commands.

In some embodiments, return buffer state commands 2016 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 2016 includes selecting the size and number of return buffers to use for a set of pipeline operations.

The remaining commands in the command sequence differ based on the active pipeline for operations. Based on a pipeline determination 2020, the command sequence is tailored to the 3D pipeline 2022 beginning with the 3D pipeline state 2030 or the media pipeline 2024 beginning at the media pipeline state 2040.

The commands to configure the 3D pipeline state 2030 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 2030 commands are also able to selectively disable or bypass certain pipeline elements if those elements will not be used.

In some embodiments, 3D primitive 2032 command is used to submit 3D primitives to be processed by the 3D pipeline. Commands and associated parameters that are passed to the graphics processor via the 3D primitive 2032 command are forwarded to the vertex fetch function in the graphics pipeline. The vertex fetch function uses the 3D primitive 2032 command data to generate vertex data structures. The vertex data structures are stored in one or more return buffers. In some embodiments, 3D primitive 2032 command is used to perform vertex operations on 3D primitives via vertex shaders. To process vertex shaders, 3D pipeline 2022 dispatches shader execution threads to graphics processor execution units.

In some embodiments, 3D pipeline 2022 is triggered via an execute 2034 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 2010 follows the media pipeline 2024 path when performing media operations. In general, the specific use and manner of programming for the media pipeline 2024 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 2024 is configured in a similar manner as the 3D pipeline 2022. A set of commands to configure the media pipeline state 2040 are dispatched or placed into a command queue before the media object commands 2042. In some embodiments, media pipeline state commands 2040 include data to configure the media pipeline elements that will be used to process the media objects. This includes data to configure the video decode and video encode logic within the media pipeline, such as encode or decode format. In some embodiments, media pipeline state commands 2040 also support the use of one or more pointers to "indirect" state elements that contain a batch of state settings.

In some embodiments, media object commands 2042 supply pointers to media objects for processing by the media pipeline. The media objects include memory buffers containing video data to be processed. In some embodiments, all media pipeline states must be valid before issuing a media object command 2042. Once the pipeline state is configured and media object commands 2042 are queued, the media pipeline 2024 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 21:
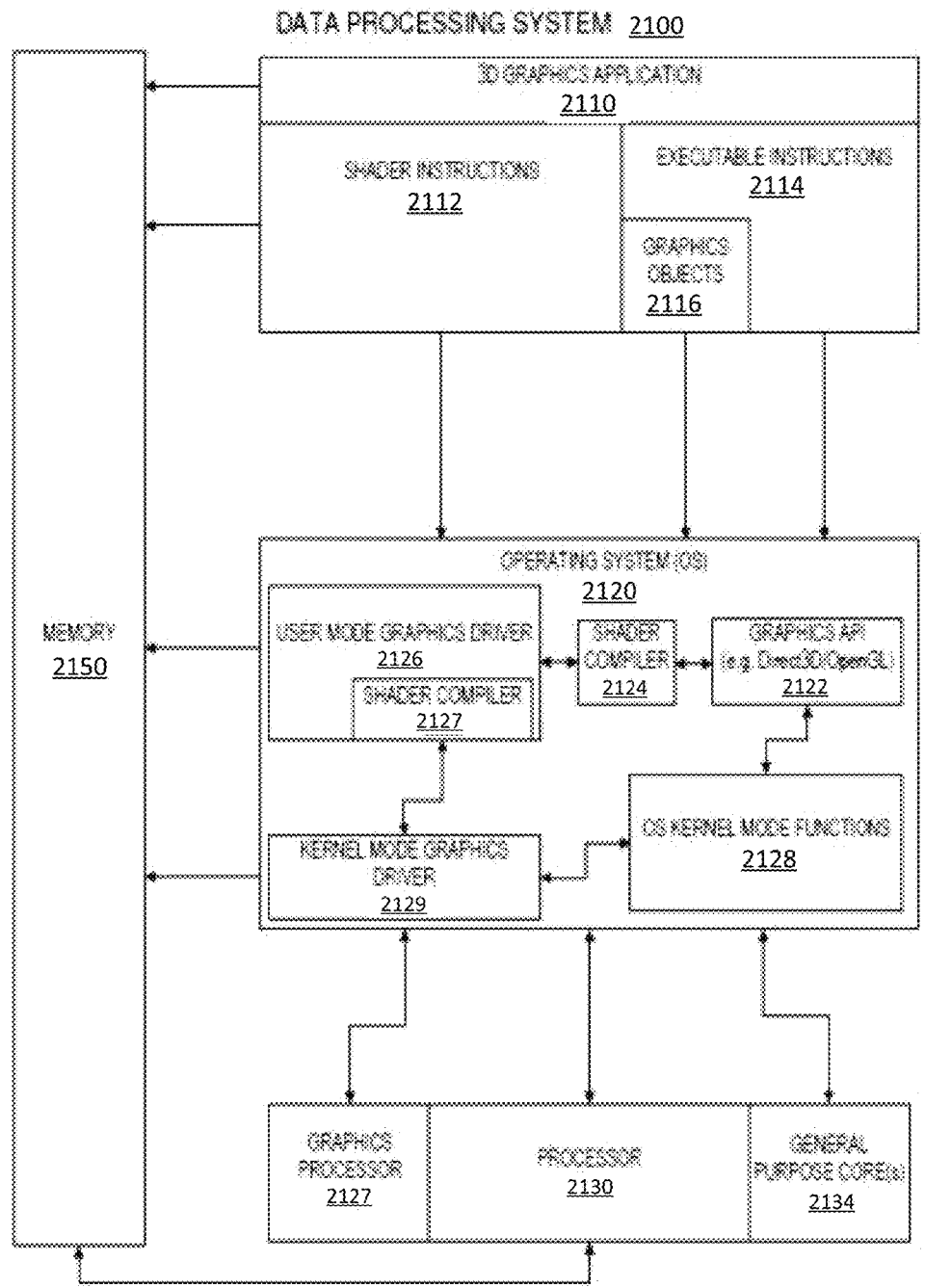
FIG. 21 illustrates exemplary graphics software architecture for a data processing system according to an embodiment.

FIG. 21 illustrates exemplary graphics software architecture for a data processing system 2100 according to some embodiments. In some embodiments, software architecture includes a 3D graphics application 2110, an operating system 2120, and at least one processor 2130. In some embodiments, processor 2130 includes a graphics processor 2132 and one or more general-purpose processor core(s) 2134. The graphics application 2110 and operating system 2120 each execute in the system memory 2150 of the data processing system.

In some embodiments, 3D graphics application 2110 contains one or more shader programs including shader instructions 2112. The shader language instructions may be in a high-level shader language, such as the High Level Shader Language (HLSL) or the OpenGL Shader Language (GLSL). The application also includes executable instructions 2114 in a machine language suitable for execution by the general-purpose processor core 2134. The application also includes graphics objects 2116 defined by vertex data.

In some embodiments, operating system 2120 is a Microsoft® Windows® operating system from the Microsoft Corporation, a proprietary UNIX-like operating system, or an open source UNIX-like operating system using a variant of the Linux kernel. The operating system 2120 can support a graphics API 1022 such as the Direct3D API, the OpenGL API, or the Vulkan API. When the Direct3D API is in use, the operating system 2120 uses a front-end shader compiler 2124 to compile any shader instructions 2112 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 2110. In some embodiments, the shader instructions 2112 are provided in an intermediate form, such as a version of the Standard Portable Intermediate Representation (SPIR) used by the Vulkan API.

In some embodiments, user mode graphics driver 2126 contains a back-end shader compiler 2127 to convert the shader instructions 2112 into a hardware specific representation. When the OpenGL API is in use, shader instructions 2112 in the GLSL high-level language are passed to a user mode graphics driver 2126 for compilation. In some embodiments, user mode graphics driver 2126 uses operating system kernel mode functions 2128 to communicate with a kernel mode graphics driver 2129. In some embodiments, kernel mode graphics driver 2129 communicates with graphics processor 2132 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 22:
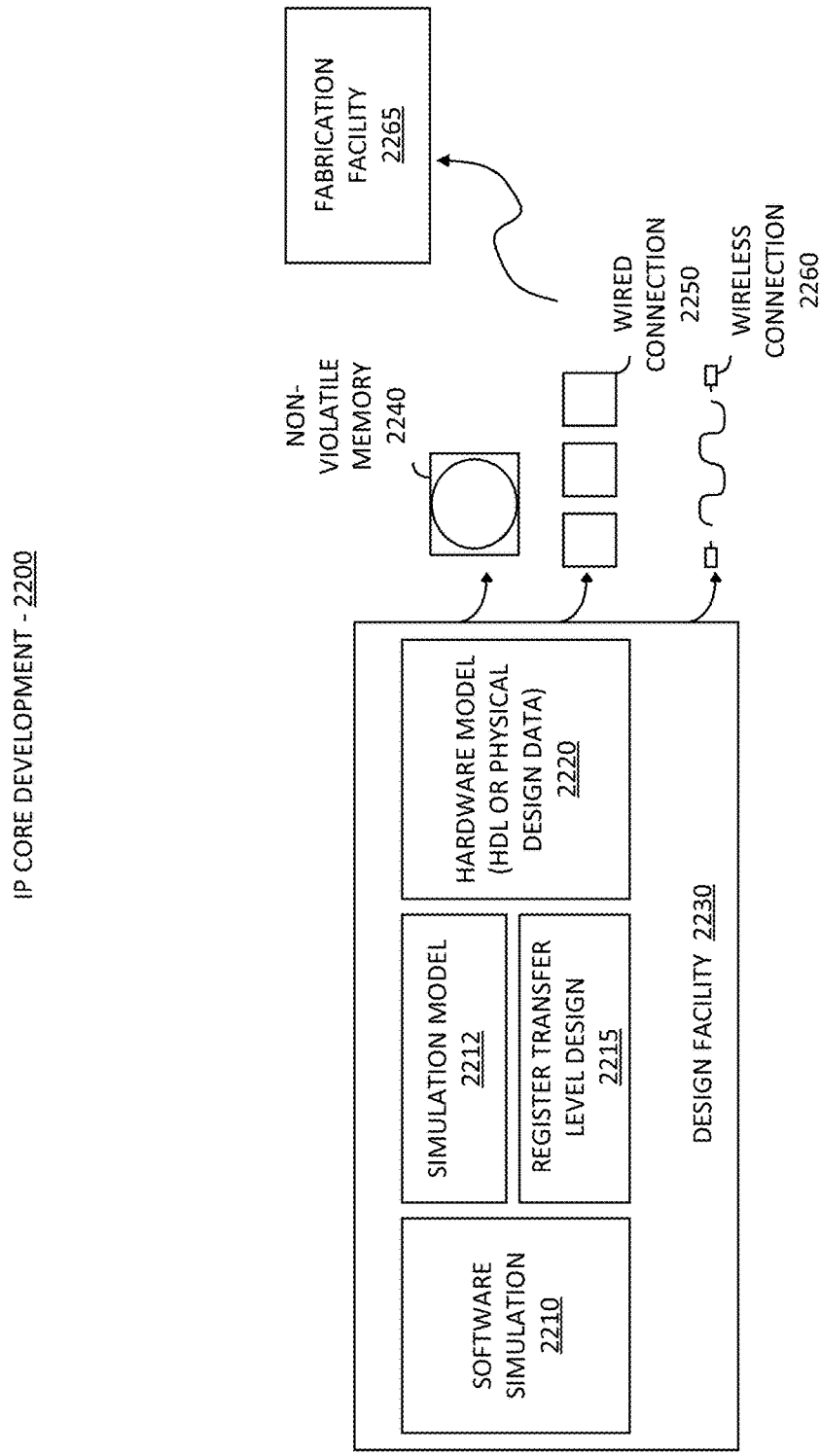
FIG. 22 is a block diagram illustrating an IP core development system that may be used to manufacture an integrated circuit to perform operations according to an embodiment.

FIG. 22 is a block diagram illustrating an IP core development 2200 that may be used to manufacture an integrated circuit to perform operations according to an embodiment. The IP core development system 2200 may be used to generate modular, re-usable designs that can be incorporated into a larger design or used to construct an entire integrated circuit (e.g., an SOC integrated circuit). A design facility 2230 can generate a software simulation 2210 of an IP core design in a high level programming language (e.g., C/C++). The software simulation 2210 can be used to design, test, and verify the behavior of the IP core using a simulation model 2212. The simulation model 2212 may include functional, behavioral, and/or timing simulations. A register transfer level (RTL) design can then be created or synthesized from the simulation model 2200. The RTL design 2215 is an abstraction of the behavior of the integrated circuit that models the flow of digital signals between hardware registers, including the associated logic performed using the modeled digital signals. In addition to an RTL design 2215, lower-level designs at the logic level or transistor level may also be created, designed, or synthesized. Thus, the particular details of the initial design and simulation may vary.

The RTL design 2215 or equivalent may be further synthesized by the design facility into a hardware model 2220, which may be in a hardware description language (HDL), or some other representation of physical design data. The HDL may be further simulated or tested to verify the IP core design. The IP core design can be stored for delivery to a $3^{rd}$ party fabrication facility 2265 using non-volatile memory 2240 (e.g., hard disk, flash memory, or any non-volatile storage medium). Alternatively, the IP core design may be transmitted (e.g., via the Internet) over a wired connection 2250 or wireless connection 2260. The fabrication facility 2265 may then fabricate an integrated circuit that is based at least in part on the IP core design. The fabricated integrated circuit can be configured to perform operations in accordance with at least one embodiment described herein.

Exemplary System on a Chip Integrated Circuit

Figure 23:
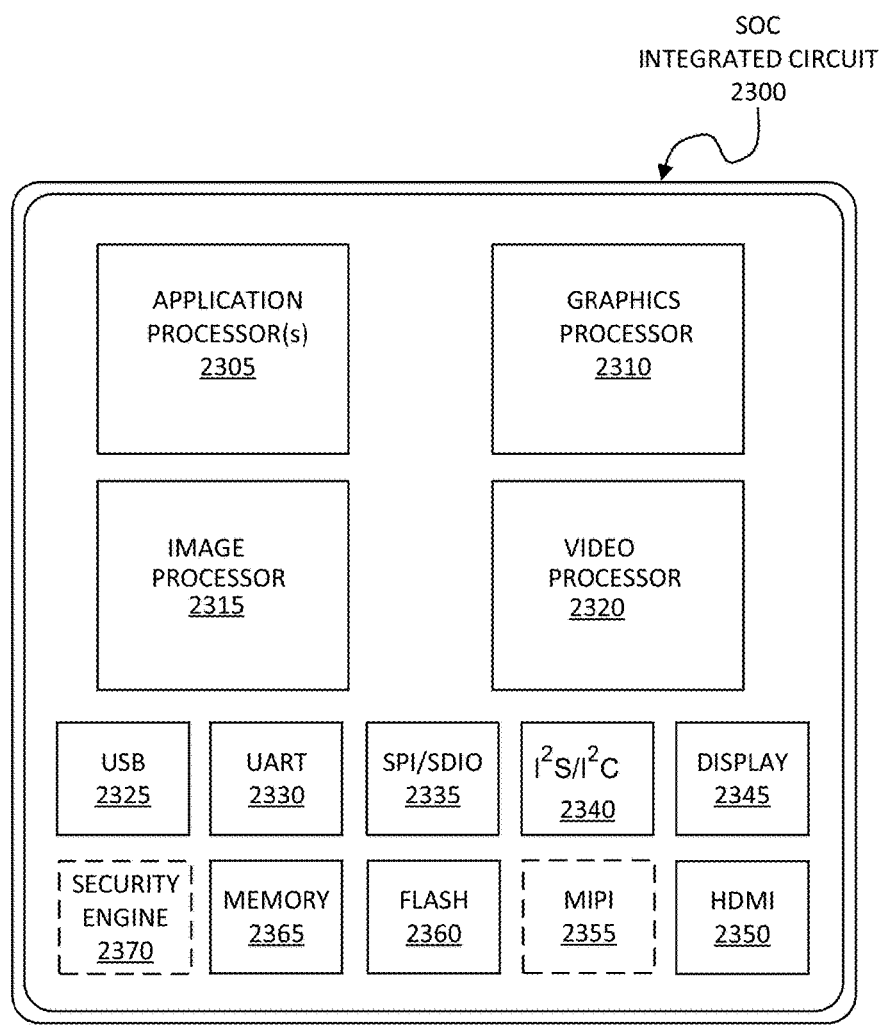
FIG. 23 is a block diagram illustrating an exemplary system on a chip integrated circuit that may be fabricated using one or more IP cores, according to an embodiment.
Figure 24:
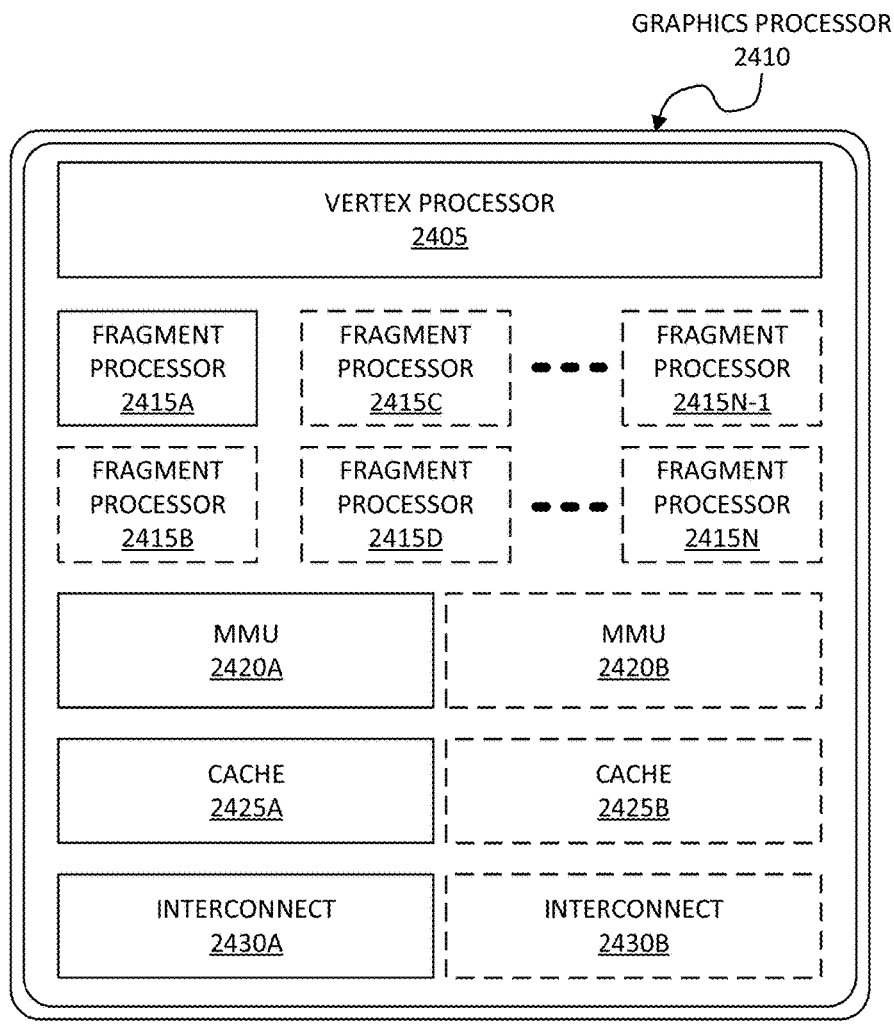
FIG. 24 is a block diagram illustrating an exemplary graphics processor of a system on a chip integrated circuit that may be fabricated using one or more IP cores, according to an embodiment.
Figure 25:
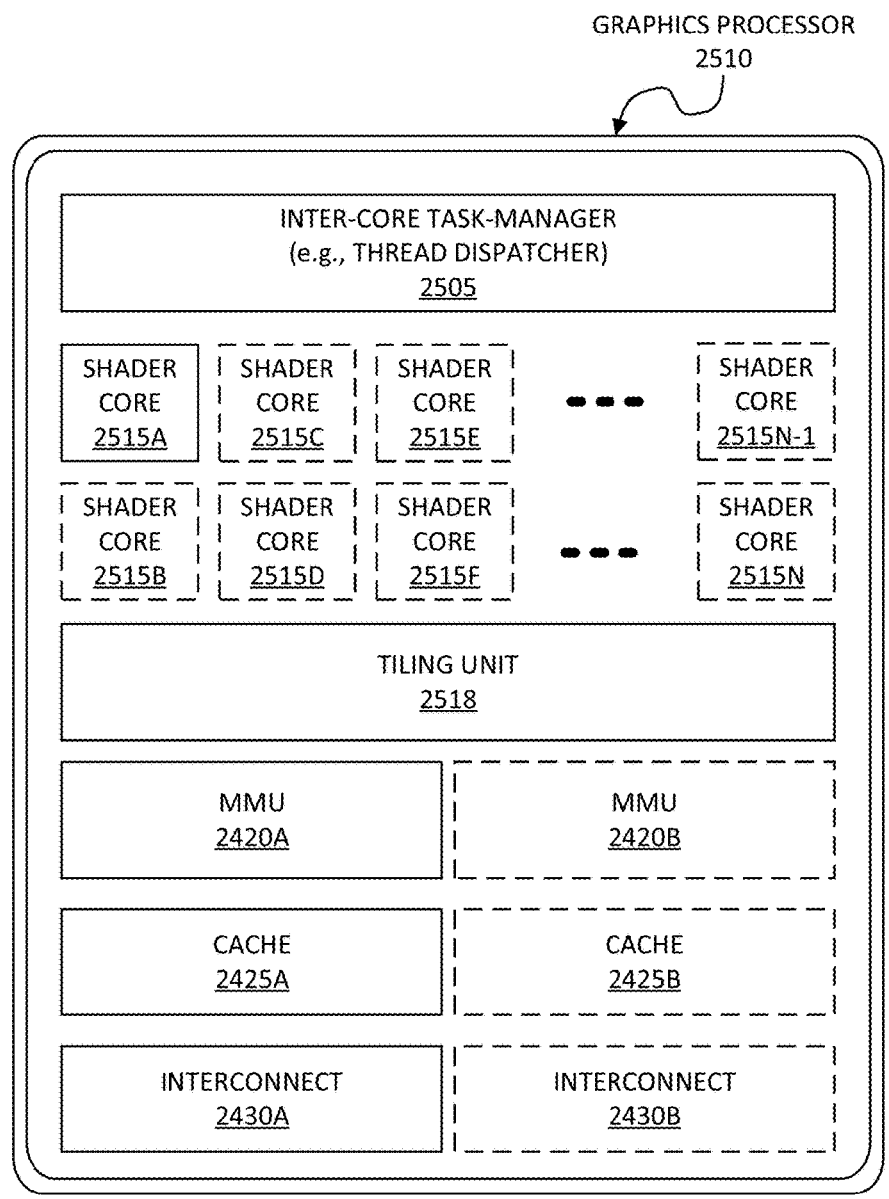
FIG. 25 is a block diagram illustrating an additional exemplary graphics processor of a system on a chip integrated circuit that may be fabricated using one or more IP cores, according to an embodiment.

FIGS. 23-25 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 23 is a block diagram illustrating an exemplary system on a chip integrated circuit 2300 that may be fabricated using one or more IP cores, according to an embodiment. Exemplary integrated circuit 2300 includes one or more application processor(s) 2305 (e.g., CPUs), at least one graphics processor 2310, and may additionally include an image processor 2315 and/or a video processor 2320, any of which may be a modular IP core from the same or multiple different design facilities. Integrated circuit 2300 includes peripheral or bus logic including a USB controller 2325, UART controller 2330, an SPI/SDIO controller 2335, and an $I^2S/I^2C$ controller 2340. Additionally, the integrated circuit can include a display device 2345 coupled to one or more of a high-definition multimedia interface (HDMI) controller 2350 and a mobile industry processor interface (MIPI) display interface 2355. Storage may be provided by a flash memory subsystem 2360 including flash memory and a flash memory controller. Memory interface may be provided via a memory controller 2365 for access to SDRAM or SRAM memory devices. Some integrated circuits additionally include an embedded security engine 2370.

Additionally, other logic and circuits may be included in the processor of integrated circuit 2300, including additional graphics processors/cores, peripheral interface controllers, or general purpose processor cores.

FIG. 24 is a block diagram illustrating an exemplary graphics processor 2410 of a system on a chip integrated circuit that may be fabricated using one or more IP cores, according to an embodiment. Graphics processor 2410 can be a variant of the graphics processor 2310 of FIG. 23. Graphics processor 2410 includes a vertex processor 2405 and one or more fragment processor(s) 2415A-2415N (e.g., 2415A, 2415B, 2415C, 2415D, through 2415N-1, and 2415N). Graphics processor 2410 can execute different shader programs via separate logic, such that the vertex processor 2405 is optimized to execute operations for vertex shader programs, while the one or more fragment processor(s) 2415A-2415N execute fragment (e.g., pixel) shading operations for fragment or pixel shader programs. The vertex processor 2405 performs the vertex processing stage of the 3D graphics pipeline and generates primitives and vertex data. The fragment processor(s) 2415A-2415N use the primitive and vertex data generated by the vertex processor 2405 to produce a framebuffer that is displayed on a display device. In one embodiment, the fragment processor(s) 2415A-2415N are optimized to execute fragment shader programs as provided for in the OpenGL API, which may be used to perform similar operations as a pixel shader program as provided for in the Direct 3D API.

Graphics processor 2410 additionally includes one or more memory management units (MMUs) 2420A-2420B, cache(s) 2425A-2425B, and circuit interconnect(s) 2430A-2430B. The one or more MMU(s) 2420A-2420B provide for virtual to physical address mapping for integrated circuit 2410, including for the vertex processor 2405 and/or fragment processor(s) 2415A-2415N, which may reference vertex or image/texture data stored in memory, in addition to vertex or image/texture data stored in the one or more cache(s) 2425A-2425B. In one embodiment the one or more MMU(s) 2425A-2425B may be synchronized with other MMUs within the system, including one or more MMUs associated with the one or more application processor(s) 1805, image processor 2315, and/or video processor 2320 of FIG. 23, such that each processor 2305-2320 can participate in a shared or unified virtual memory system. The one or more circuit interconnect(s) 2430A-2430B enable graphics processor 2410 to interface with other IP cores within the SoC, either via an internal bus of the SoC or via a direct connection, according to embodiments.

FIG. 25 is a block diagram illustrating an additional exemplary graphics processor 2510 of a system on a chip integrated circuit that may be fabricated using one or more IP cores, according to an embodiment. Graphics processor 2510 can be a variant of the graphics processor 2310 of FIG. 23. Graphics processor 2510 includes the one or more MMU(s) 2420A-2420B, caches 2425A-2425B, and circuit interconnects 2430A-2430B of the integrated circuit 2400 of FIG. 24.

Graphics processor 2510 includes one or more shader core(s) 2515A-2515N (e.g., 2515A, 2515B, 2515C, 2515D, 2515E, 2515F, through 2415N-1, and 2415N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 2510 includes an inter-core task manager 2505, which acts as a thread dispatcher to dispatch execution threads to one or more shader cores 2515A-2515N and a tiling unit 2518 to accelerate tiling operations for tile-based rendering, in which rendering operations for a scene are subdivided in image space, for example to exploit local spatial coherence within a scene or to optimize use of internal caches.

Additional and Alternative Implementation Notes

In the above description of example implementations, for purposes of explanation, specific numbers, materials configurations, and other details are set forth to explain better the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and computer-readable instructions as indicated by the context described herein.

As used in this application, the term "or" is intended to mean an inclusive "or" rather than an exclusive "or." That is unless specified otherwise or clear from context, "X employs A or B" is intended to mean any of the natural inclusive permutations. That is if X employs A; X employs B; or X employs both A and B, then "X employs A or B" is satisfied under any of the preceding instances. Also, the articles "an" and "an" as used in this application and the appended claims should be construed to mean "one or more," unless specified otherwise or clear from context to be directed to a singular form.

These processes are illustrated as a collection of blocks in a logical flow graph, which represents a sequence of operations that can be implemented in mechanics alone or a combination of hardware, software, and firmware. In the context of software/firmware, the blocks represent instructions stored on one or more computer-readable storage media that, when executed by one or more processors, perform the recited operations.

Note that the order in which the processes are described is not intended to be construed as a limitation and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

In the claims appended herein, the inventor invokes 35 U.S.C. § 112(f) or paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. 112(f) or paragraph 6.

To the extent various operations or functions are described herein, they can be described or defined as hardware circuitry, software code, instructions, configuration, and/or data. The content can be embodied in hardware logic, or as directly executable software ("object" or "executable" form), source code, high-level shader code designed for execution on a graphics engine, or low-level assembly language code in an instruction set for a specific processor or graphics core. The software content of the embodiments described herein can be provided via an article of manufacture with the content stored thereon, or via a method of operating a communication interface to send data via the communication interface.

A non-transitory machine-readable storage medium can cause a machine to perform the functions or operations described, and includes any mechanism that stores information in a form accessible by a machine (e.g., computing device, electronic system, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

In Example 1: A graphics processing unit (GPU), the GPU comprising: one or more graphics cores configured to process computer graphics, the one or more graphics cores being further configured to operate with a memory; the one or more graphics cores being further configured to: obtain pixel data associated with a multi-sample pixel stored in the memory, the multi-sample pixel having multiple samples; the pixel data includes fragment data that contains information regarding one or more fragments covering one or more samples of the multi-sample pixel, the fragment data includes a sample-to-fragment map that indicates fragment coverage of the samples; read the sample-to-fragment map; based on the read sample-to-fragment map, determine the one or more samples are invalid and thus not associated with any fragment.

In Example 2: A GPU as recited in Example 1, wherein the pixel data includes a mode tracker mode, the one or more graphics cores are further configured to: obtain the mode tracker metadata that stores a mode-indicative value that corresponds to the multi-sample pixel that is stored in the memory; based on the obtained mode-indicative value, determine whether the pixel is stored with a separate color per sample or is stored as fragment data, wherein the fragment data includes a color value for each fragment covering one or more of the samples of the pixel and a mapping to specify which fragment covers each sample.

In Example 3: A GPU as recited in Example 2, wherein the sample-to-fragment map is configured to store values for a larger number of samples that are supported when the pixel is stored with a separate color per sample.

In Example 4: A GPU as recited in Example [0270], wherein the one or more graphics cores are further configured to, based on the read sample-to-fragment map, determine the one or more samples are invalid and thus not associated with any fragment, the invalidity determination includes selecting one or more samples for invalidity by samples associated with lowest priority fragments, wherein a fragments priority is set based upon a highest priority of sample that a fragment covers.

In Example 5: A GPU as recited in Example 1, wherein the multiple samples of the multi-sample pixel are divided into a normal set and a coverage set, wherein the normal set includes normal samples that are specified in sample mode and the coverage set includes coverage samples that are implicitly invalid in sample mode.

In Example 6: A GPU as recited in Example 5, wherein the multiple samples of the multi-sample pixel includes 16 samples with four samples being normal samples and 12 samples being coverage samples.

In Example 7: A GPU as recited in Example 1, wherein the fragment data includes a fragment color set stored in the memory, the sample-to-fragment map being stored within the fragment color set, the fragment color set having a memory footprint, the sample-to-fragment map occupying the memory footprint of the fragment color set.

In Example 8: A GPU as recited in Example 1, wherein: the fragment data being stored in a fragment color set in the memory, the fragment color set having a number (N) of fragment slots, each slot configured to store one color value; each sample entry in the sample-to-fragment map having a bit-length of no more than ceiling(log(N)) base 2.

In Example 9: A GPU as recited in Example 1, wherein the one or more graphics cores being further configured to: write a sample-to-fragment map to memory; apply lossless block compression to the sample-to-fragment map stored in the memory.

In Example 10: A GPU as recited in Example 1, wherein the one or more graphics cores being further configured to: apply lossless block compression to a combination of the sample color set, fragment color set, and a sample-to-fragment map; store the block compressed combination in the memory.

In Example 11: A GPU as recited in Example 1, wherein the pixel data includes a mode tracker mode, the one or more graphics cores are further configured to: obtain the mode tracker metadata that stores a mode-indicative value that corresponds to the multi-sample pixel that is stored in the memory; based on the obtained mode-indicative value, determine whether the pixel is stored with a separate color per sample or is stored as fragment data, wherein the fragment data includes a color value for each fragment covering one or more of the samples of the pixel and a mapping to specify which fragment covers each sample; determine a set of fragments that are capable of being stored in fragment mode does not cover all of a set of normal samples; in response to that determination, store the pixel with a separate color per sample.

In Example 12: A graphics processing unit (GPU), the GPU comprising: one or more graphics cores configured to process computer graphics, the one or more graphics cores being further configured to operate with a memory; the one or more graphics cores being further configured to: obtain pixel data associated with multiple multi-sample pixels stored in the memory, each of the multi-sample pixel having common number of multiple samples and P being a number of multiple pixels; the pixel data associated with each of the multiple multi-sample pixels includes sample data and fragment data regarding fragments covering the associated samples; generate a pixel block that includes pixel-block data, the pixel-block data having sample data and fragment data, the sample data being configured to store P sample colors and the fragment data being configured to store a number of fragment colors that is greater than P; store the pixel block wherein each pixel of the multiple multi-sample pixels is associated with one or more of the P sample colors and one or more of the fragment colors.

In Example 13: A GPU as recited in Example 1, wherein the one or more graphics cores being further configured to: obtain a mode tracker metadata that stores a mode-indicative value, the mode-tracker metadata being stored in the memory, that corresponds to the multiple multi-sample pixels; based on the obtained mode-indicative value, determine whether a sample of each pixel of the multi-sample pixels is associated with one or more of the P colors In Example 14: A GPU as recited in Example 1, wherein the one or more graphics cores being further configured to: based on the obtained mode-indicative value, determine that the one or more samples of the multi-sample pixels are invalid and thus not associated with any fragments.

In Example 15: One or more computer-readable media storing instructions thereon that, when executed by one or more processors, direct the one or more processors to perform operations comprising: obtaining pixel data associated with a multi-sample pixel stored in the memory, the multi-sample pixel having multiple samples; the pixel data includes fragment data that contains information regarding one or more fragments covering one or more samples of the multi-sample pixel, the fragment data includes a sample-to-fragment map that indicates fragment coverage of the samples; reading the sample-to-fragment map; based on the read sample-to-fragment map, determining the one or more samples are invalid and thus not associated with any fragment.

In Example 16: One or more computer-readable media of Example 15, wherein the pixel data includes a mode tracker mode, the operations further comprise: obtaining the mode tracker metadata that stores a mode-indicative value that corresponds to the multi-sample pixel that is stored in the memory; based on the obtained mode-indicative value, determining whether the pixel is stored with a separate color per sample or is stored as fragment data, wherein the fragment data includes a color value for each fragment covering one or more of the samples of the pixel and a mapping to specify which fragment covers each sample.

In Example 17: One or more computer-readable media of Example 16, wherein the sample-to-fragment map is configured to store values for a larger number of samples that are supported when the pixel is stored with a separate color per sample.

In Example 18: One or more computer-readable media of Example 17, wherein the operations further comprise, based on the read sample-to-fragment map, determining the one or more samples are invalid and thus not associated with any fragment, the invalidity determination includes selecting one or more samples for invalidity by samples associated with lowest priority fragments, wherein a fragments priority is set based upon a highest priority of sample that a fragment covers.

In Example 19: One or more computer-readable media of Example 15, wherein the multiple samples of the multi-sample pixel are divided into a normal set and a coverage set, wherein the normal set includes normal samples that are specified in sample mode and the coverage set includes coverage samples that are implicitly invalid in sample mode.

In Example 20: One or more computer-readable media of Example 15, wherein the multiple samples of the multi-sample pixel includes 16 samples with four samples being normal samples and 12 samples being coverage samples.

In Example 21: One or more computer-readable media of Example 15, wherein the fragment data includes a fragment color set stored in the memory, the sample-to-fragment map being stored within the fragment color set, the fragment color set having a memory footprint, the sample-to-fragment map occupying the memory footprint of the fragment color set.

In Example 22: One or more computer-readable media of Example 15, wherein: the fragment data being stored in a fragment color set in the memory, the fragment color set having a number (N) of fragment slots, each slot configured to store one color value; each sample entry in the sample-to-fragment map having a bit-length of no more than ceiling (log(N)) base 2.

In Example 23: One or more computer-readable media of Example 15, wherein the operations further comprise: writing a sample-to-fragment map to memory; applying lossless block compression to the sample-to-fragment map stored in the memory.

In Example 24: One or more computer-readable media of Example 15, wherein the operations further comprise: applying lossless block compression to a combination of the sample color set, fragment color set, and a sample-to-fragment map; storing the block compressed combination in the memory.

In Example 25: One or more computer-readable media of Example 15, wherein the operations further comprise the pixel data includes a mode tracker mode, the operations further comprise: obtaining the mode tracker metadata that stores a mode-indicative value that corresponds to the multi-sample pixel that is stored in the memory; based on the obtained mode-indicative value, determining whether the pixel is stored with a separate color per sample or is stored as fragment data, wherein the fragment data includes a color value for each fragment covering one or more of the samples of the pixel and a mapping to specify which fragment covers each sample; determining a set of fragments that are capable of being stored in fragment mode does not cover all of a set of normal samples; in response to that determination, storing the pixel with a separate color per sample.

In Example 26: One or more computer-readable media storing instructions thereon that, when executed by one or more processors, direct the one or more processors to perform operations comprising: obtaining pixel data associated with multiple multi-sample pixels stored in the memory, each of the multi-sample pixel having common number of multiple samples and P being a number of multiple pixels; the pixel data associated with each of the multiple multi-sample pixels includes sample data and fragment data regarding fragments covering the associated samples; generating a pixel block that includes pixel-block data, the pixel-block data having sample data and fragment data, the sample data being configured to store P sample colors and the fragment data being configured to store a number of fragment colors that is greater than P; storing the pixel block wherein each pixel of the multiple multi-sample pixels is associated with one or more of the P sample colors and one or more of the fragment colors.

In Example 27: One or more computer-readable media of Example 26, wherein the operations further comprise: obtaining a mode tracker metadata that stores a mode-indicative value, the mode-tracker metadata being stored in the memory, that corresponds to the multiple multi-sample pixels; based on the obtained mode-indicative value, determining whether a sample of each pixel of the multi-sample pixels is associated with one or more of the P colors.

In example 28: One or more computer-readable media of Example 26, wherein the operations further comprise: based on the obtained mode-indicative value, determining that the one or more samples of the multi-sample pixels are invalid and thus not associated with any fragments.

In Example 29: A computer graphics system comprising: a pixel-data handler configured to obtain pixel data associated with a multi-sample pixel stored in the memory, the multi-sample pixel having multiple samples; the pixel data includes fragment data that contains information regarding one or more fragments covering one or more samples of the multi-sample pixel, the fragment data includes a sample-to-fragment map that indicates fragment coverage of the samples; a map reader configured to read the sample-to-fragment map; an invalidity determiner configured to, based on the read sample-to-fragment map, determine the one or more samples are invalid and thus not associated with any fragment.

In Example 30: A computer graphics system of Example 29, wherein the pixel data includes a mode tracker mode, the system further comprising: a mode tracker configured to obtain the mode tracker metadata that stores a mode-indicative value that corresponds to the multi-sample pixel that is stored in the memory; the mode tracker being further configured to, based on the obtained mode-indicative value, determine whether the pixel is stored with a separate color per sample or is stored as fragment data, wherein the fragment data includes a color value for each fragment covering one or more of the samples of the pixel and a mapping to specify which fragment covers each sample.

In Example 31: A computer graphics system of Example 30, wherein the sample-to-fragment map is configured to store values for a larger number of samples that are supported when the pixel is stored with a separate color per sample.

In Example 32: A computer graphics system of Example 31, the system further comprising, based on the read sample-to-fragment map, determine the one or more samples are invalid and thus not associated with any fragment, the invalidity determination includes selecting one or more samples for invalidity by samples associated with lowest priority fragments, wherein a fragments priority is set based upon a highest priority of sample that a fragment covers.

In Example 33: A computer graphics system of Example 29, wherein the multiple samples of the multi-sample pixel are divided into a normal set and a coverage set, wherein the normal set includes normal samples that are specified in sample mode and the coverage set includes coverage samples that are implicitly invalid in sample mode.

In Example 34: A computer graphics system of Example 29, wherein the multiple samples of the multi-sample pixel includes 16 samples with four samples being normal samples and 12 samples being coverage samples.

In Example 35: A computer graphics system of Example 29, wherein the fragment data includes a fragment color set stored in the memory, the sample-to-fragment map being stored within the fragment color set, the fragment color set having a memory footprint, the sample-to-fragment map occupying the memory footprint of the fragment color set.

In Example 36: A computer graphics system of Example 29, wherein: the fragment data being stored in a fragment color set in the memory, the fragment color set having a number (N) of fragment slots, each slot configured to store one color value; each sample entry in the sample-to-fragment map having a bit-length of no more than ceiling(log (N)) base 2.

In Example 37: A computer graphics system of Example 29, the system further comprising: a memory writer configured to write a sample-to-fragment map to memory; a compressor configured to apply lossless block compression to the sample-to-fragment map stored in the memory.

In Example 38: A computer graphics system of Example 29, the system further comprising: a compressor configured to apply lossless block compression to a combination of the sample color set, fragment color set, and a sample-to-fragment map; a memory handler configured to store the block compressed combination in the memory.

In Example 39: A computer graphics system of Example 29, wherein the pixel data includes a mode tracker mode, the system further comprising: a mode tracker configured to obtain the mode tracker metadata that stores a mode-indicative value that corresponds to the multi-sample pixel that is stored in the memory; the mode tracker being further configured to: based on the obtained mode-indicative value, determine whether the pixel is stored with a separate color per sample or is stored as fragment data, wherein the fragment data includes a color value for each fragment covering one or more of the samples of the pixel and a mapping to specify which fragment covers each sample; determine a set of fragments that are capable of being stored in fragment mode does not cover all of a set of normal samples; in response to that determination, storing the pixel with a separate color per sample.

In Example 40: A computer graphics system comprising: a pixel handler configured to obtain pixel data associated with multiple multi-sample pixels stored in the memory, each of the multi-sample pixel having common number of multiple samples and P being a number of multiple pixels; the pixel data associated with each of the multiple multi-sample pixels includes sample data and fragment data regarding fragments covering the associated samples; a pixel-block handler configured to generate a pixel block that includes pixel-block data, the pixel-block data having sample data and fragment data, the sample data being configured to store P sample colors and the fragment data being configured to store a number of fragment colors that is greater than P; the pixel-block handler further configured to storing the pixel block wherein each pixel of the multiple multi-sample pixels is associated with one or more of the P sample colors and one or more of the fragment colors.

In Example 41: A computer graphics system of Example 40, the system further comprising: a mode tracker configured to obtain a mode tracker metadata that stores a mode-indicative value, the mode-tracker metadata being stored in the memory, that corresponds to the multiple multi-sample pixels; the mode tracker further configured to, based on the obtained mode-indicative value, determine whether a sample of each pixel of the multi-sample pixels is associated with one or more of the P colors In Example 42: A computer graphics system of Example 41, the system further comprising: a mode tracker configured to, based on the obtained mode-indicative value, determine that the one or more samples of the multi-sample pixels are invalid and thus not associated with any fragments.

What is claimed is:

1. A graphics processing unit (GPU), the GPU comprising:
    one or more graphics cores configured to process computer graphics; and
    a memory configured to store pixel data associated with a multi-sample pixel that includes samples grouped into normal samples and coverage samples, the pixel data being stored in a storage footprint that includes one of a sample color data set that contains a separate color value associated with each of the normal samples when a set of fragments does not cover the normal samples, or a fragment color data set that contains (i) fragment data indicating a color value for fragments covering the normal samples and the coverage samples, and (ii) a sample-to-fragment map that indicates fragment coverage of the normal samples and the coverage samples,
    wherein the one or more graphics cores are further configured to determine, when the pixel data is stored as a fragment color data set, which of the coverage samples are invalid and thus not associated with any fragment based on the sample-to-fragment map, the invalidity being based upon a number of fragment colors associated with fragments covering a coverage sample being in excess of a maximum number of fragment color values included in the fragment color data set, and
    wherein the indication that a coverage sample is invalid causes the coverage sample to be ignored by the one or more graphic core processors when the multi-sample pixel is resolved such that an incorrect color is not assigned to the coverage sample.

2. The GPU as recited in claim 1, wherein:
    the sample-to-fragment map includes mode tracker data, and
    the one or more graphics cores are further configured to determine, based on the mode tracker data, whether the pixel data is stored with a separate color per sample or is stored as fragment data,
    wherein the sample-to-fragment map is configured to store values for a larger number of samples as compared to when the pixel data is stored with a separate color per sample.

3. A GPU as recited in claim 2, wherein the one or more graphics cores are further configured to, based on the sample-to-fragment map, determine which of the coverage samples are invalid by identifying one or more of the coverage samples as invalid in accordance with fragment priority, wherein fragment priority is based upon a coverage sample number covered by each fragment.

4. A GPU as recited in claim 1, wherein:
the normal samples are specified in a sample mode, and the coverage samples are implicitly invalid in the sample mode.

5. A GPU as recited in claim 1, wherein the samples of the multi-sample pixel include 16 samples, with four samples being the normal samples and 12 samples being the coverage samples.

6. The GPU as recited in claim 1, wherein the one or more graphics cores are further configured to store the pixel data as a sample color data set that contains a color value associated with each of the normal samples when a number of fragment colors associated with fragments covering a normal sample is greater than the maximum number of fragment color values.

7. The GPU As recited in claim 1, wherein the one or more graphics cores are configured to utilize resources associated with the memory to process the computer graphics utilizing substantially similar memory resources as those used to process a multi-sample pixel in accordance with multi-sample anti-aliasing (MSAA) of four samples per pixel (4×MSAA) when the number of samples associated with the multi-sample pixel exceeds 4.

8. A graphics processing unit (GPU), the GPU comprising:
one or more graphics cores configured to process computer graphics; and
a memory configured to store pixel data associated with multi-sample pixels stored in the memory, each of the multi-sample pixels having a common number of samples, the pixel data being associated with each of the multi-sample pixels and including sample data and fragment data regarding fragments covering the associated samples;
wherein the one or more graphics cores are further configured to:
generate a pixel block that includes pixel-block data, the pixel-block data including the sample data and the fragment data associated with the pixel data corresponding to the multi-sample pixels, the sample data being configured to store sample colors and the fragment data being configured to store a number of fragment colors that is greater than the number of sample colors; and
store the pixel block in the memory, wherein each pixel from among the multi-sample pixels is associated with one or more of the sample colors and one or more of the fragment colors,
wherein the pixel data for each multi-sample pixels is stored in the pixel block in a storage footprint that includes one of (i) a sample color data set that contains separate sample color values associated with the samples for each pixel when a set of fragments for a particular pixel does not cover normal samples associated with that pixel, or (ii) a fragment color data set that contains the fragment data indicating the fragment colors associated with the samples for each pixel;
obtain mode-tracker data indicative of a mode-indicative value that is stored as part of the fragment data, the mode-tracker data corresponding to the multi-sample pixels; and
determine whether one or more of the multi-sample pixels are invalid and thus not associated with any fragment based on the mode-indicative value,
wherein the invalidity of the one or more multi-sample pixels as indicated by the mode-indicative value is based upon a number of fragment colors associated with fragments covering a sample being in excess of a maximum number of fragment color values included in the fragment color data set, and
wherein the indication that the one or more multi-sample pixels is invalid causes the one or more multi-sample pixels to be ignored by the one or more graphic core processors when the one or more multi-sample pixels are resolved such that an incorrect color is not assigned.

9. A GPU as recited in claim 8, wherein the one or more graphics cores are further configured to
based on the obtained mode-indicative value, determine whether a sample of each pixel from among the multi-sample pixels is associated with one or more of the sample colors.

10. One or more non-transitory computer-readable media storing instructions thereon that, when executed by one or more processors, direct the one or more processors to perform operations comprising:
obtaining pixel data associated with a multi-sample pixel stored in the memory, the multi-sample pixel having multiple samples grouped into normal samples and coverage samples,
the pixel data being stored in a storage footprint that includes one of a sample color data set that contains a color value associated with the normal samples, or a fragment color data set that includes (i) a color value for fragments covering the normal samples and the coverage samples, and (ii) a sample-to-fragment map that indicates fragment coverage of the normal samples and the coverage samples;
reading the sample-to-fragment map; and
based on the read sample-to-fragment map, determining, when the pixel data is stored as a fragment color data set, which of the coverage samples are invalid and thus not associated with any fragment based upon a number of fragment colors associated with fragments covering a coverage sample being in excess of the maximum number of fragment color values, and
wherein the indication that a coverage sample is invalid causes the coverage sample to be ignored by the one or more processors when the multi-sample pixel is resolved such that an incorrect color is not assigned to the coverage sample.

11. The one or more non-transitory computer-readable media of claim 10, wherein the sample-to-fragment map includes mode tracker data, and further storing instructions that, when executed by the one or more processors, further direct the one or more processors to perform the operations comprising:
obtaining the mode tracker data that is indicative of a mode-indicative value that corresponds to the multi-sample pixel from the memory;
based on the obtained mode-indicative value, determining whether the multi-sample pixel is stored with a separate color per sample or is stored as fragment data
wherein the sample-to-fragment map is configured to store values for a larger number of samples as compared to when the pixel data is stored with a separate color per sample.

12. The one or more non-transitory computer-readable media of claim 11, further storing instructions that, when executed by the one or more processors, further direct the one or more processors to perform the operations comprising:

based on the read sample-to-fragment map, determining which of the coverage samples are invalid by identifying one or more of the coverage samples for as invalid in accordance with fragment priority, wherein fragment priority is based upon a coverage sample number covered by each fragment.

13. The one or more non-transitory computer-readable media of claim 10, wherein normal samples are specified in a sample mode and the coverage samples are implicitly invalid in the sample mode.

14. The one or more computer-readable media of claim 10, further storing instructions that, when executed by the one or more processors, further direct the one or more processors to store the pixel data as a sample color data set that contains a color value associated with each of the normal samples when a number of fragment colors associated with fragments covering a normal sample is greater than the maximum number of fragment color values.

* * * * *